(12) United States Patent
Kondo et al.

(10) Patent No.: US 9,104,958 B2
(45) Date of Patent: Aug. 11, 2015

(54) PRINTING APPARATUS

(71) Applicant: SEIKO EPSON CORPORATION, Tokyo (JP)

(72) Inventors: Manabu Kondo, Nagano (JP); Yasuhiko Yoshihisa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 14/289,005

(22) Filed: May 28, 2014

(65) Prior Publication Data

US 2015/0036156 A1 Feb. 5, 2015

(30) Foreign Application Priority Data

Jul. 30, 2013 (JP) .................................. 2013-157808
Nov. 14, 2013 (JP) .................................. 2013-236293

(51) Int. Cl.
G06K 15/16 (2006.01)
G06K 15/00 (2006.01)
B41J 11/00 (2006.01)

(52) U.S. Cl.
CPC ............. G06K 15/4065 (2013.01); B41J 11/00 (2013.01); G06K 15/16 (2013.01)

(58) Field of Classification Search
CPC B41J 11/008; B41J 13/0018; G03G 15/6558; G03G 2215/00405; G03G 2215/00561
USPC .................................................. 358/1.1, 1.12
See application file for complete search history.

(56) References Cited

U.S. PATENT DOCUMENTS

| | | | |
|---|---|---|---|
| 7,407,245 B2* | 8/2008 | Endo | 347/14 |
| 2009/0003908 A1 | 1/2009 | Horade | |
| 2011/0075193 A1* | 3/2011 | Kumamoto et al. | 358/1.15 |
| 2011/0285974 A1* | 11/2011 | Yoshida | 355/22 |

FOREIGN PATENT DOCUMENTS

JP 2009-006580 A 1/2009

* cited by examiner

*Primary Examiner* — Iriana Cruz
(74) *Attorney, Agent, or Firm* — Global IP Counselors, LLP

(57) ABSTRACT

In order for skew relative to the transport direction to be detected in a sheet which is transported to a recording unit, a carriage is initially moved in a scanning direction to a first position and the sheet is transported in this state. Then, when the front edge of the sheet in the transport direction is detected by a second sensor, the carriage is moved in a direction so that the second sensor is no longer able to locate the front edge to a second position, which is separated from the first position by a regulating movement distance. Furthermore, the sheet is transported to where the second sensor locates the front edge of the sheet in the transport direction at the second position and skew in the sheet is detected based on this transport distance and the regulating movement distance.

10 Claims, 15 Drawing Sheets

PRINTING APPARATUS

CROSS-REFERENCE TO RELATED APPLICATIONS

This application claims priority to Japanese Patent Application No. 2013-157808 filed on Jul. 30, 2013 and Japanese Patent Application No. 2013-236293 filed on Nov. 14, 2013. The entire disclosures of Japanese Patent Application Nos. 2013-157808 and 2013-236293 are hereby incorporated herein by reference.

BACKGROUND

Technical Field

The present invention relates to a printing apparatus.

A printing apparatus is provided with a recording section for performing recording (printing) with regard to a medium with a sheet shape and a transporting section which transports the medium toward the recording section. A carriage, which is able to move in a scanning direction which intersects with the transport direction of the medium, is provided in the recording section of the printing apparatus. A recording head, which is able to perform recording with regard to the medium which is transported to the recording section, is provided in the carriage. In the printing apparatus, printing is performed with regard to the medium using the recording head while the medium is transported to the recording section by the transporting section and the carriage is appropriately moved in the scanning direction. The medium after printing is completed in this manner is discharged to the downstream side of the recording section by the transporting section.

However, there are cases in recent years of demand for printing with high precision with regard to a medium such as 3D printing (printing which is stereoscopically visible). In this case, it is important that skew with regard to the transport direction does not occur in the medium. If printing is performed in a state where there is skew in the medium, there is a concern that the printing position with regard to the medium will deviate from the appropriate position. In particular, it is necessary that an expensive specialist medium is used in order to perform 3D printing and the expensive specialist media are wastefully consumed when printing is performed at a position which is not appropriate with regard to the medium and stereoscopic viewing is not possible. As a result, it is conceivable that skew with regard to the transport direction may be detected in the medium and measures may be taken based on the detecting of skew by applying the technique in Japanese Unexamined Patent Application Publication No. 2009-6580.

Here, skew with regard to the transport direction is detected in the medium in Japanese Unexamined Patent Application Publication No. 2009-6580 in the following manner. That is, a sensor which is able to locate an edge section of the medium is provided in the carriage and the positions of both edges of the medium in the scanning direction are each located by the sensor at two locations which are separated in the transport direction. In detail, the positions of both edge sections of the medium in the scanning direction are located at a first location by the carriage moving back and forth once across the entire width of the medium in the scanning direction in a state where transporting of the medium is stopped when the medium reaches the recording section. After this, the transporting is stopped after the medium is transported by a predetermined amount and the positions of both edge sections of the medium in the scanning direction are located at a second location by the carriage moving back and forth once in the scanning direction in the same manner as described above in this state. Then, skew with regard to the transport direction is detected in the medium based on the position of both edges of the medium in the scanning direction at the two locations described above.

It is possible for skew with regard to the transport direction to be detected in the medium, which is transported to the recording unit, by applying the technique in Japanese Unexamined Patent Application Publication No. 2009-6580. However, it takes a long time from starting an operation for detecting skew in the medium to starting printing when attempting to start printing (recording) with regard to the medium in a case where skew is not detected in the medium. This is due to reasons [1] and [2] below.

[1] It is necessary for the carriage to be moved back and forth across the entire width of the medium in the scanning direction a total of twice in order to locate each of the positions of both edges of the medium in the scanning direction at two locations which are separated in the transport direction and the time required for this is long.

[2] It is necessary for the front edge of the medium in the transport direction to be returned further upstream in the same transport direction than the recording unit by moving the medium in the opposite direction to the transport direction and extra time is taken to that extent when skew is not detected in the medium and printing (recording) with regard to the medium is started after completing the operation for the detecting of skew.

SUMMARY

An object of the present invention is to provide a printing apparatus where, in a case where skew with regard to the transport direction is not detected in a medium, it is possible to shorten the time from starting of an operation for detecting skew to starting recording with regard to the medium.

A means for solving the problem described above and operational effects thereof are described below.

A printing apparatus which solves the problem described above is provided with a transport unit configured to transport a medium with a sheet shape to a recording unit configured to perform recording with regard to the medium, a carriage which is provided in the recording unit and is configured to move in a scanning direction which intersects with regard to the transport direction of the medium by to the transport unit, a sensor which is provided in the carriage and is configured to locate the presence or absence of the medium, a control unit configured to control operating of the transport unit and the carriage, and a detection unit configured to detect skew of the medium relative to the transport direction. Then, the control unit is configured to operate the recording unit and the carriage in the following manner as an operation for detecting skew with regard to the transport direction in the medium. That is, the control unit is configured to move the carriage to a first position where the front edge of the medium in the transport direction is located by the sensor, move the carriage in a direction such that the sensor no longer locates the medium to a second position, which is separated from the first position by a regulating movement distance, when the front edge of the medium, which is transported to the recording unit by the transport unit, in the transport direction is detected by the sensor at the first position, and transport the medium using the transport unit to where the sensor locates the front edge of the medium in the transport direction at the second position. In addition, the detection unit is configured to detect skew of the medium relative to the transport direction of the medium based on the regulating movement distance and the transport distance of the medium by the transport unit from where the sensor locates the front edge of the medium in the transport direction at the first position to where the sensor locates the front edge of the medium in the transport direction at the second position.

According to the configuration described above, the distance between the first position and the second position in the scanning direction of the carriage is the regulating movement distance and it is possible for the regulating movement distance to be set to be a smaller value than the distance across the entire width of the medium in the scanning direction. By the regulating movement distance being set in this manner, the time required for the carriage to move from the first position to the second position is shortened. Furthermore, it is possible to start recording by transporting the medium to the downstream side from the position of the medium when there is a case where skew with regard to the transport direction is not detected in the medium when the sensor locates the front edge of the medium in the transport direction in a state where the carriage is displaced to the second position. In addition, the transport amount of the medium in the opposite direction (to the upstream side in the transport direction) in such a case is kept to a small amount even if it is assumed that it is necessary to return the medium to the position where recording starts which is to the upstream side in the transport direction. Due to this, it is possible to shorten the time from starting operating of the transport unit and the carriage in order to detect skew to starting recording with regard to the medium in a case where skew with regard to the transport direction is not detected in the medium.

Here, it is preferable that the control unit be further configured to move the carriage to one side in the scanning direction after the front edge of the medium in the transport direction is located by the sensor at the first position, reverse the movement direction of the carriage in a case where the medium is located by the sensor at the one side, and perform moving of the carriage by the regulating movement distance in a case where the medium is not located by the sensor.

There are cases where, when the carriage is moved from the first position to the second position in the scanning direction, the carriage which is at the first position is initially moved in the opposite direction to the second direction. The medium is located by the sensor also after moving of the carriage at this time starts in the opposite direction to the second position in a case where the medium is skewed with regard to the transport direction. The control unit faces the carriage toward the second position by reversing the movement direction of the carriage when the medium is located by the sensor in this manner. Due to this, it is possible to detect skew in the medium by reversing the movement direction of the carriage toward the second position even when the carriage is moving from the first position in the opposite direction to the second position. Here, it is possible to suppress wasteful movement of the carriage as much as possible when moving from the first position to the second position if the carriage faces toward the second position by immediately reversing the movement direction of the carriage when the medium is located by the sensor in a case where the carriage moved from the first position in the opposite direction to the second position.

Here, it is preferable that the control unit be configured such that the transport unit is operated so the medium is discharged in the transport direction when the skew of the medium is detected by the detection unit.

According to the configuration described above, it is possible to discharge the medium in the transport direction when the skew of the medium is large enough to impede recording with regard to the medium. Accordingly, it is possible to avoid wasteful consumption of media due to performing recording with regard to a medium which is skewed. In addition, it is possible to apply the configuration to a printing apparatus with a configuration where the medium is not able to move in the opposite direction to the transport direction since the medium is discharged in the transport direction when skew is detected in the medium.

In addition, it is preferable that the control unit be configured so that a skew removing operation in order to eliminate the skew of the medium is executed using the transport unit when the skew of the medium is detected in the medium by the detection unit.

According to the configuration described above, even when there is skew in the medium, it is possible to dispense with the trouble of resetting due to having to discharge a medium which is skewed since it is possible to start recording with regard to the medium after eliminating skew using the skew removing operation.

It is preferable that the control unit be configured so as to determine whether or not operating of the transport unit and the carriage in order to detect the skew of the medium relative to the transport direction in the medium by the detection unit, is to be executed according to whether the medium which is transported to the recording unit is a medium for which recording with high precision is necessary, or a medium for which recording with high precision is not necessary. That is, the control unit executes the operating of the transport unit and the carriage in order to detect the skew of the medium relative to the transport direction by the detection unit, when the medium which is transported to the recording unit is a medium for which recording with high precision is necessary. On the other hand, the control unit does not execute operating of the transport unit and the carriage, which is in order to detect skew with regard to the transport direction in the medium by the detection unit, when the medium which is transported to the recording unit is a medium where recording with high precision is not necessary.

According to the configuration described above, it is possible to execute operating of the transport unit and the carriage in order to detect skew when the medium which is transported to the recording unit is a medium where recording with high precision is necessary, that is, when skew with regard to the transport direction in the medium is a problem for recording with regard to the medium. On the other hand, it is possible to not perform operating of the transport unit and the carriage in order to detect skew when the medium which is transported to the recording unit is a medium where recording with high precision is not necessary, that is, when skew with regard to the transport direction in the medium is not a problem for recording with regard to the medium. Accordingly, it is possible to execute detecting of skew with regard to the transport direction in the medium only when necessary without any unnecessary executing. In addition, the time taken to start recording with regard to the medium is not lengthened in accordance with such unnecessary executing since detecting of skew with regard to the transport direction in the medium is not unnecessarily executed.

In addition, it is preferable that the printing apparatus be further provided with a supporting section which is configured to support the medium and has a concave and convex surface which is formed by a plurality of convex sections which are provided along the scanning direction, and the first position and the second position are each set at positions in the scanning direction where shapes of the concave and convex surface are the same.

According to this configuration, the first position and the second position are set at positions, where the shapes of the concave and convex surface are the same, in the support section in the movement direction of the carriage. As a result, the amount of reflecting of light, which is incident on the sensor by being reflected at positions where the shapes of the concave and convex surface are the same, is substantially the same at the first position and the second position. As a result, it is possible to suppress a reduction in the precision of detecting skew which is caused by deviations in the output value due to differences in the amount of light received in the sensor due to the light of the sensor being irradiated onto positions where the shapes of the concave and convex surface are different at the first position and the second position.

It is preferable that the control unit in the printing apparatus described above be configured to positionally align the carriage in the scanning direction by acquiring a reference position for the carriage by matching levels and moving the carriage to the first position and the second position which are determined in advance with the reference position as a reference.

According to this configuration, the control unit positionally aligns the carriage in the scanning direction by acquiring the reference position for the carriage by matching levels and moving the carriage between the first position and the second position which are determined in advance with the reference position as a reference. It is possible to arrange the sensor at positions where the shapes of the concave and convex surface are the same when the sensor is arranged at either of the first position and the second position.

Furthermore, it is preferable that the control unit in the printing apparatus described above be configured to detect positions where the shapes of the concave and convex surface are the same using the sensor by moving the carriage in a state where no medium is on the support section and acquire the first position and the second position where the sensor is to be arranged based on the positions which are detected.

According to this configuration, the control unit detects positions where the shapes of the concave and convex surface are the same using the sensor by moving the carriage in a state where there is no medium on the support section and acquires the first position and the second position where the sensor is to be arranged based on the positions which are detected. As such, it is possible for the sensor to be arranged at the first position and the second position in a relatively accurate manner even when there are irregularities in position in the convex and concave surface in the scanning direction due to causes such as irregularities in assembling the support section or the like.

It is preferable that the first position and the second position in the printing apparatus described above be set to positions on top surfaces of the convex sections.

According to this configuration, the first position and second position are both set to positions on the top surfaces of the convex sections which are positions where the shapes of the concave and convex surface are the same. It is easy for light reflectivity to change due to the effects of ink such as when, for example, ink gathers or flows in a bottom section, but light reflectivity is comparatively stable at the top surfaces of the convex sections where the first position and the second position are set and it is possible to reduce erroneous detecting of skew.

In addition, it is preferable that the first position and the second position in the printing apparatus described above be set to positions on a surface section where an amount of received light, where reflected light of light which is irradiated from the sensor is received in the sensor, is the lowest out of a plurality of types of surface sections which define the shape of the convex and concave surface.

According to this configuration, it is possible for the transport amount, when the medium enters into the light spot of the sensor until the output of the sensor exceeds a threshold, to be relatively large and the proportion of the medium which is taken up in the light spot of the sensor to be relatively large since the first position and the second position are set to positions on a surface section where the amount of received light, where reflected light of light which is irradiated from the sensor is received in the sensor, is the lowest. As a result, it is possible to relatively reduce the effects due to deviations in the convex and concave surface since the proportion of the concave and convex surface which is taken up in the light spot is relatively small even when, for example, the position of the sensor which is arranged at the first position or the second position slightly deviates in the scanning direction due to causes such as irregularities in assembling the support section. As such, it is possible to reduce erroneous detecting of skew relative to the positional deviations.

Furthermore, it is preferable that a diameter of a light spot which is irradiated from the sensor onto the convex and concave surface be wider in the scanning direction than a width of the top surface in the printing apparatus described above.

According to this configuration, there are cases where there are locations with localized abnormalities in light reflectivity on the convex and convex surface at a specific surface which is a detection target due to, for example, dust from the medium (for example, paper dust), ink mist, or the like being attached. Even in cases such as this, it is possible to reduce erroneous detecting of skew due to this type of abnormal location since the proportion which is taken up by the abnormal locations in the light spot is relatively small.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

An embodiment of a printing apparatus will be described below with reference to FIG. 1 to FIG. 10.

Figure 1:
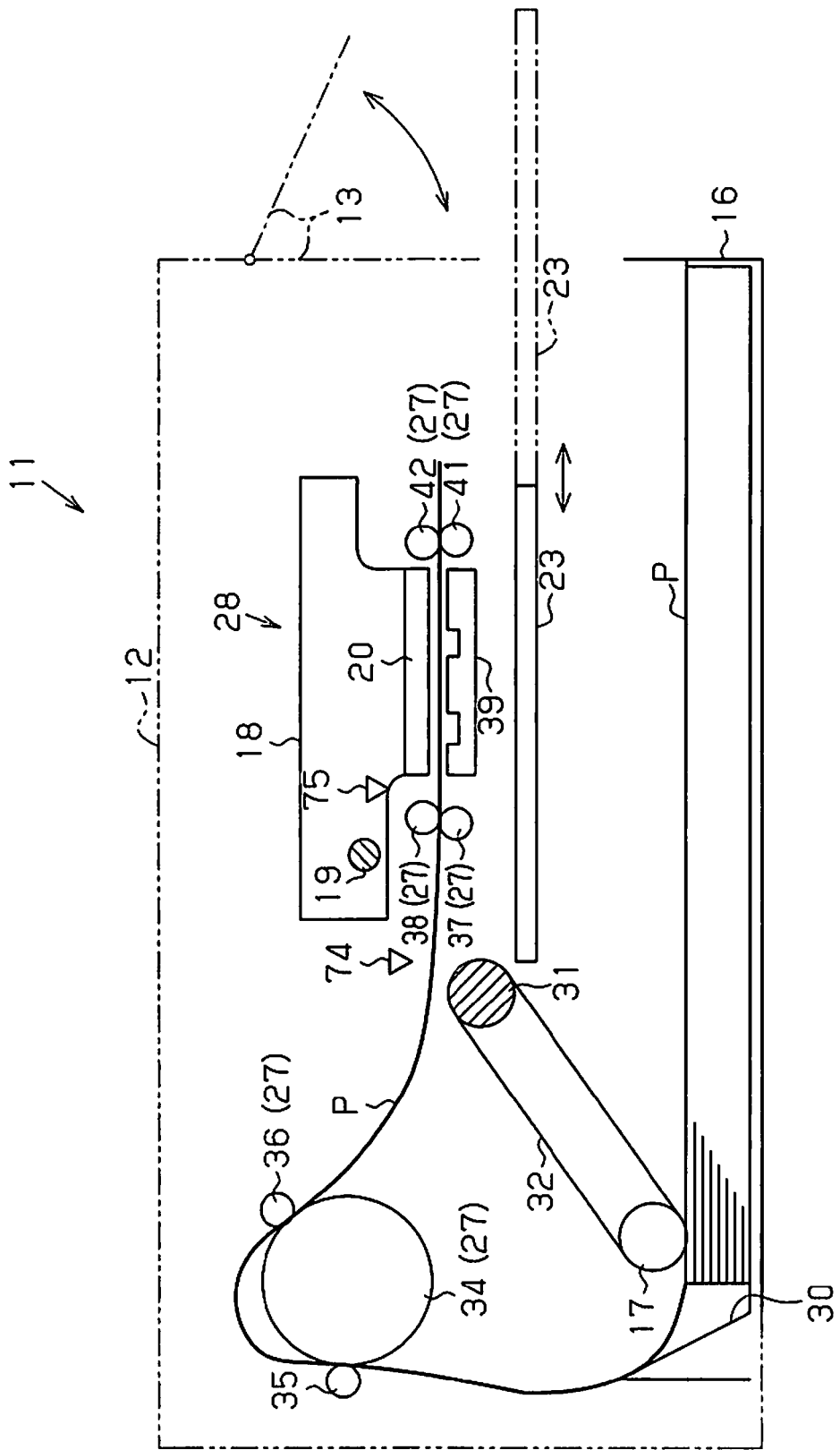
FIG. 1 is a rough diagram illustrating the entire configuration of a printing apparatus.

An operation panel 13 which is operated by a user is provided on a front surface (on the right surface in the diagram) of a body 12 of a printing apparatus 11 shown in FIG. 1. A supply cassette 16 where it is possible to accommodate a plurality of sheets P, which are media which are a recording target of the printing apparatus 11, is mounted at a lower side of the operation panel 13 in the body 12 in a state of being able to be taken out. A swinging member 32 which is able to swing centered on a swinging shaft 31 is provided at an upper side of the supply cassette 16 in the body 12. A pickup roller 17 which is provided at a front edge of the swinging member 32 comes into contact with the uppermost of each of the sheets P which are accommodated in the supply cassette 16. Then, the sheet P which is the uppermost sheet is sent out from the supply cassette 16 to the downstream side in a supply direction (the right side in the diagram) by the pickup roller 17 being driven to rotate.

A separating section 30, which separates the sheet P which is the uppermost sheet and the sheets at lower positions in the supply cassette 16 while the sheets P are being sent out from the supply cassette 16, is provided at a front edge section of the supply cassette 16 on the downstream side in the supply direction. A supply driving roller 34 which is driven to rotate and a separating roller 35 and a supply driven roller 36 which comes into contact with the supply driving roller 34 are provided in the body 12 more to the downstream side than the separating section 30 in the supply direction (the upper side in the diagram). The separating roller 35 again performs separating between the sheet P which is sent out from the separating section 30 and the supply driving roller 34 and reliably sends only the sheet P which is the uppermost sheet in the supply cassette 16 to between the supply driving roller 34 and the supply driven roller 36. The sheet P is transported toward a recording unit 28 which performs recording (printing) with regard to the sheet P by the supply driving roller 34 being driven to rotate after the sheet P is pinched by the supply driving roller 34 and the supply driven roller 36.

The supply driving roller 34 and the supply driven roller 36 at this time function as a transport unit 27 in order to transport the sheet P to the recording unit 28. Other than being provided with the supply driving roller 34 and the supply driven roller 36, the transport unit 27 is also provided with a transport driving roller 37, a transport driven roller 38, a discharge driving roller 41, and a discharge driven roller 42. The transport driven roller 38 is pressure welded to the transport driving roller 37 and is rotated by being driven through rotational driving of the transport driving roller 37. In addition, the discharge driving roller 41 and the discharge driven roller 42 are positioned more to the downstream side than the transport driving roller 37 and the transport driven roller 38 in a transport direction (the left side in the diagram). Then, the discharge driven roller 42 is pressure welded with regard to the discharge driving roller 41 and is rotated by being driven through rotational driving of the discharge driving roller 41.

The sheet P, which is sent out from between the supply driving roller 34 and the supply driven roller 36 to the downstream side in the transport direction, is pinched between the transport driving roller 37 and the transport driven roller 38 and sent downstream in the transport direction due to the transport driving roller 37 being driven to rotate. Furthermore, the sheet P is also pinched between the discharge driving roller 41 and the discharge driven roller 42 and sent downstream in the transport direction due to the discharge driving roller 41 being driven to rotate. The recording unit 28 which performs printing with regard to the sheet P is provided with a carriage 18 which is able to move along a guide shaft 19 which extends in the direction which the sheet P is transported, that is, a direction which intersects with regard to a direction from left to right in the diagram (a direction which is orthogonal to the surface of the paper in this example). A portion of the bottom surface of the carriage 18, which corresponds to between the transport driven roller 38 and the discharge driven roller 42, is provided in a state where a recording head 20, which is for performing printing with regard to the sheet P, is able to oppose the sheet P.

It is possible for the relative position of the carriage 18 with regard to the guide shaft 19 in the up and down direction to be adjusted in a number of stages (four stages in this example) through a height position adjusting mechanism. In addition, a support platform 39 is provided between the transport driving roller 37 and the discharge driving roller 41 in a state of opposing the recording head 20 in the carriage 18. Then, the distance between the recording head 20 and the support platform 39 is lengthened as the carriage 18 is moved upward with regard to the guide shaft 19 through the height position adjusting mechanism, that is, as the height position of the carriage 18 is higher. Accordingly, it is possible to change the distance between the recording head 20 and the support platform 39 in four stages through adjusting the height position of the carriage 18 through the height position adjusting mechanism.

Printing with regard to the sheet P using the recording unit 28 is realized by ejecting ink droplets from nozzles in the recording head 20 with regard to the sheet P while the sheet P is being transported to the recording unit 28 by the transport unit 27 and the carriage 18 is being appropriately moved in a direction in which the guide shaft 19 extends (a scanning direction). At this time, the support platform 39 supports the sheet P and the distance between the sheet P and the recording head 20 is regulated. The distance between the support platform 39 and the recording head 20 is adjusted to any of the four stages due to adjusting of the height position of the carriage 18 according to the type (thickness) of the sheet P. Here, the sheet P where printing is performed using the recording unit 28 is discharged to a stacker 23, which is arranged toward the front surface (toward the right in the diagram) of the body 12 and which is shown in FIG. 1 using a two-dot chain line, by the sheet P being sent to the downstream side in the transport direction by the transport unit 27.

Next, the electrical configuration of the printing apparatus 11 will be described.

Figure 2:
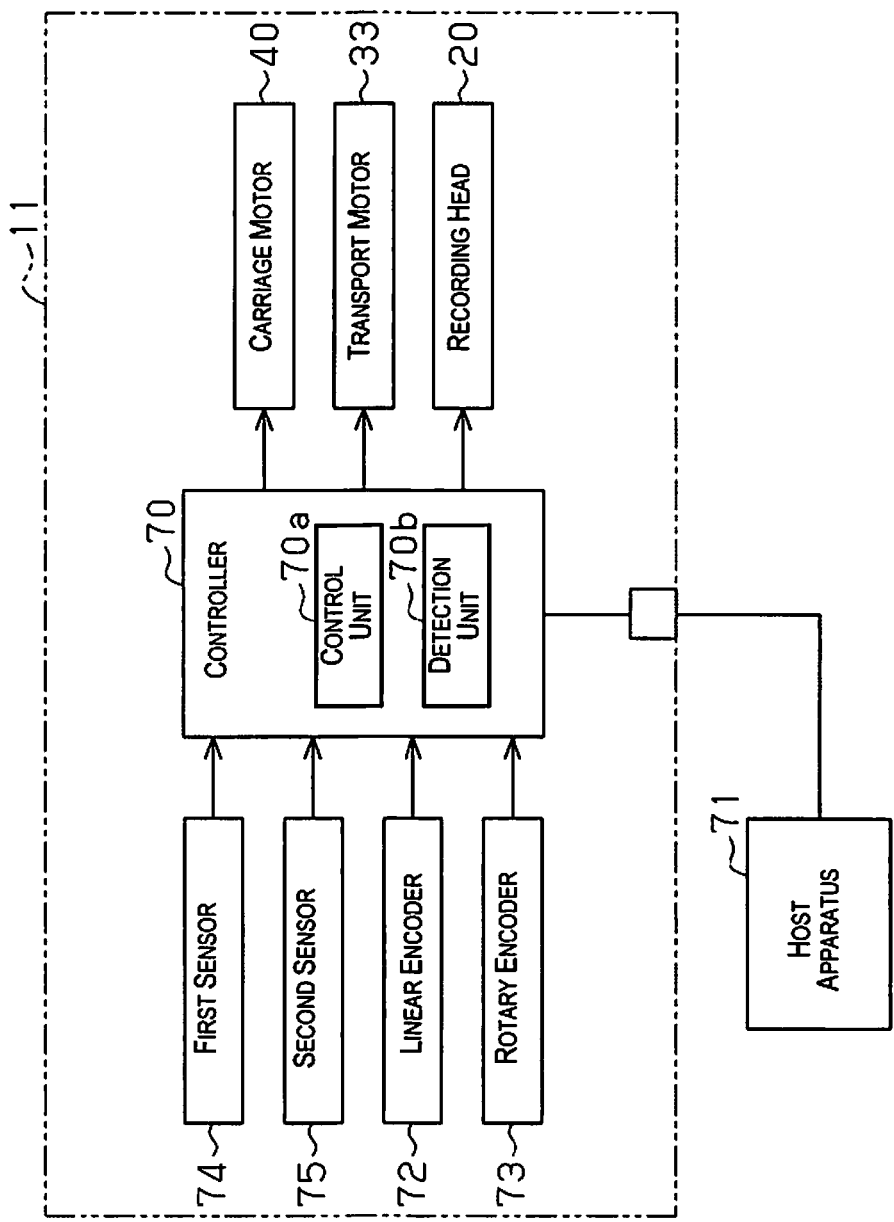
FIG. 2 is a block diagram illustrating an electric configuration of a printing apparatus.

A controller 70 which overlooks each type of control is mounted in the printing apparatus 11 as shown in FIG. 2. The controller 70 is configured to be provided with a CPU, an ASIC (Application Specific IC), a RAM which is a volatile memory, a RAM which is a non-volatile memory, a ROM, and the like. A first sensor 74, a second sensor 75, a linear encoder 72, and a rotary encoder 73 are connected in the controller 70 as an input system. In addition, a carriage motor 40, a transport motor 33, and the recording head 20 are also connected in the controller 70 as an output system.

The first sensor 74 is provided between the supply driven roller 36 and the transport driven roller 38 at an upstream side of the recording unit 28 in the body 12 (FIG. 1). The first sensor 74 is configured to be able to locate the presence or absence of the sheet P. As a result, it is possible for a front edge of the sheet P, which is transported to the recording unit 28 by the transport unit 27, in the transport direction (the right direction in FIG. 1) to be located by the first sensor 74. On the other hand, the second sensor 75 is provided in the carriage 18. The second sensor 75 is also configured to be able to locate the presence or absence of the sheet P in the same manner as the first sensor 74. As a result, it is possible for a front edge of the sheet P, which is transported to the recording unit 28 by the transport unit 27, in the transport direction to be located by the second sensor 75.

In accordance with movement of the carriage 18 in the scanning direction, the linear encoder 72 outputs a pulse signal which has a number of pulses which are proportional to the amount of the movement. Then, the controller 70 counts up the pulses of the pulse signal which are received from the linear encoder 72 and the movement position of the carriage 18 in the scanning direction with a home position as the origin is ascertained based on the counted value. On the other hand, the rotary encoder 73 is configured so that, in accordance with rotating when the transport motor 33 is driven such as when the transport motor 33 is driven so as to transport the sheet P to the recording unit 28, a pulse signal is output with a number of pulses which are proportional to the amount of the rotating. Then, the controller 70 counts up the pulses of the pulse signal which are received from the rotary encoder 73 and the transport amount (transport distance) of the sheet P, such as when the sheet P is transported to the recording unit 28 based on the counted value, is ascertained.

The controller 70 receives printing job data from a host apparatus 71 such as a personal computer which is connected to the printing apparatus 11. The host apparatus 71 generates printing image data where execution of printing is specified based on printing conditions information which is set by a user. Here, sheet type, sheet size, printing color, printing quality, and the like are included in the printing conditions information described above. Then, the host apparatus 71 adds a header which includes a portion of the printing conditions information in the printing image data which is generated and transmits this to the controller 70 as the printing job data.

The controller 70 controls the printing operations and the like of the printing apparatus 11 based on the printing job data which is received. In detail, the controller 70 carries out controlling of the transport motor 33, the carriage motor 40, and the recording head 20 which are related to the printing operations and the like of the printing apparatus 11. Through controlling of the transport motor 33 at this time, the sheet P which is accommodated in the supply cassette 16 is supplied from the supply cassette 16 and the sheet P after being supplied is transported to and downstream from the recording unit 28. In addition, ejecting of ink droplets is performed using the recording head 20 while the carriage 18 is appropriately moved in the scanning direction through controlling of the carriage motor 40 and controlling of the recording head 20.

Printing is performed in the recording unit 28 with regard to the sheet P using the recording head 20 while the sheet P is being transported to the recording unit 28 through controlling of the transport motor 33, the carriage motor 40, and the recording head 20 in this manner. In detail, an image or the like is printed on the sheet P based on the printing image data described above through ejecting of ink droplets from the recording head 20 with regard to the sheet P. Furthermore, the sheet P after printing is complete in the recording unit 28 is discharged to the stacker 23 using the driving force of the transport unit 27 which is controlled by the transport motor 33.

Here, the controller 70 has a function as a control unit which controls operating of the transport unit 27 and the carriage 18 when the transport unit 27 is operated through controlling of the transport motor 33 and when the carriage 18 is operated through controlling the carriage motor 40. In other words, the controller 70 is provided with a control unit 70a which carries out the function as described above. In addition, the controller 70 is provided with a detection unit 70b which detects skew with regard to the transport direction in the sheet P when the sheet P is transported to the recording unit 28 by the transport unit 27.

FIG. 3 to FIG. 6 illustrate movement of the transport unit 27 (the sheet P) and the carriage 18 in order to detect skew.

Figure 3:
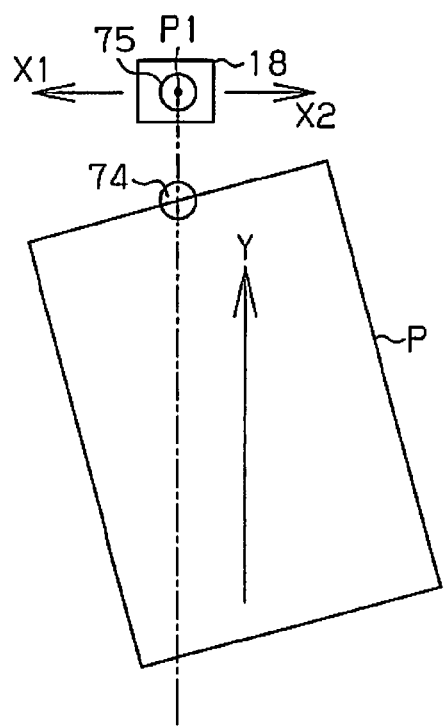
FIG. 3 is a rough diagram illustrating movement of a carriage and a sheet when detecting skew in a sheet.

The controller 70 moves the carriage 18 in the scanning direction (arrows X1 and X2) to a first position P1 as shown in FIG. 3 when the sheet P is transported to the recording unit 28 by the transport unit 27 so as to perform printing with regard to the sheet P. The first position P1 is a position where it is possible for the front edge of the sheet P in the transport direction to be located by the second sensor 75, in detail, a position which corresponds to substantially the center of the sheet P in the scanning direction. Here, a configuration is adopted in the printing apparatus 11 of the embodiment so that the center of the sheet P, which is transported to the recording unit 28, in the scanning direction is always arranged at a constant position in the scanning direction without any relationship to the size of the sheet P. As a result, the first position P1 in the embodiment is always constant without any relationship to the size of the sheet P.

Figure 4:
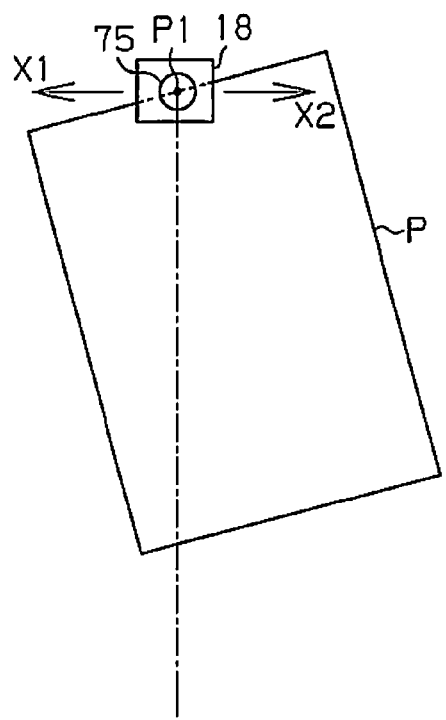
FIG. 4 is a rough diagram illustrating movement of a carriage and a sheet when detecting skew in a sheet.

When the sheet P is transported by the transport unit 27 in a state where the carriage 18 is moved to the first position P1, the front edge of the sheet P in the transport direction (the direction of the arrow Y) approaches the recording unit 28 and reaches a position which corresponds to the first sensor 74. At this time, the front edge is located by the first sensor 74. Based on the position of the front edge of the sheet P, which is detected by the first sensor 74, in the transport direction, the controller 70 ascertains the position of the sheet P when transporting progresses beyond this. Then, transporting of the sheet P progresses and the front edge is detected by the second sensor 75 when the front edge of the sheet P in the transport direction is positioned to correspond to the second sensor 75 as shown in FIG. 4. Then, the controller 70 stops transporting of the sheet P by the transport unit 27 and moves the carriage 18 to a second position P2 shown in FIG. 5 based on detecting of the front edge of the sheet P in the transport direction by the second sensor 75.

The second position P2 is a position where the carriage 18 is separated from the first position P1 by a regulating movement distance x in a direction so that the second sensor 75 no longer locates the sheet P in (the direction of the arrow X1 in this example) the scanning direction which is indicated by the arrows X1 and X2 in FIG. 4. Here, the regulating movement distance x is set to a value which is shorter than the distance from the first position P1 to an edge of the sheet P in the scanning direction (an edge in the direction of the arrow X1 in this example) so that the carriage 18 is as close to the edge as possible. It is preferable that the size of the sheet P be ascertained from information, which relates to the printing conditions which are included in the printing job data which is transmitted from the host apparatus 71, and the regulating movement distance x be set according to the size of the sheet P which is ascertained.

Figure 6:
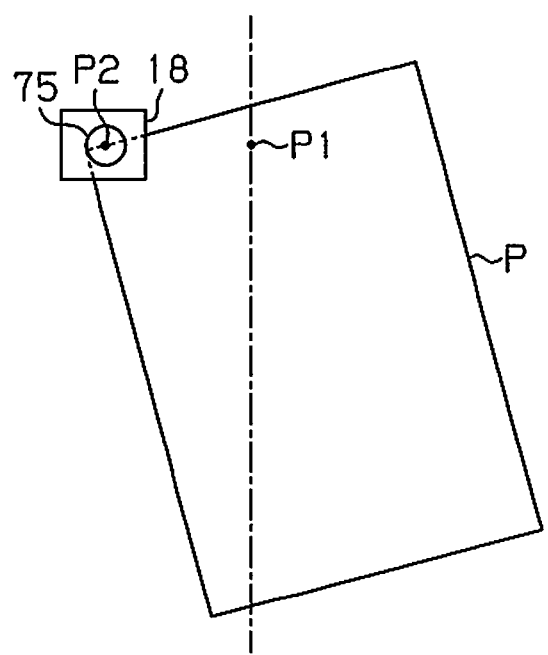
FIG. 6 is a rough diagram illustrating movement of a carriage and a sheet when detecting skew in a sheet.

Then, when the sheet P is transported by the transport unit 27 in a state where the carriage 18 is moved to the second position P2, the front edge of the sheet P in the transport direction is located by the second sensor 75 when the front edge is positioned to correspond to the second sensor 75 as shown in FIG. 6. The controller 70 (the detection unit 70b) determines the distance over which the sheet P is transported by the transport unit 27 (referred to below as a transport distance y) from locating of the front edge by the second sensor 75 at the first position P1 to locating of the front edge at the second position P2. The controller 70 detects skew with regard to the transport direction in the sheet P, which is transported to the recording unit 28, based on the transport distance y and the regulating movement distance x. Then, the controller 70 performs printing with regard to the sheet P using the recording unit 28 when skew is not detected in the sheet P and the sheet P after printing is discharged to the stacker 23. On the other hand, the controller 70 discharges the sheet P to the stacker 23 by transporting the sheet P downstream in the transport direction without performing printing on the sheet P using the recording unit 28 when skew is detected in the sheet P.

Next, actions of the printing apparatus 11 will be described.

There is a concern that the printing position with regard to the sheet P will deviate from the appropriate position when printing is performed in a state where there is skew in the direction in which the sheet P is transported in a case where printing with high precision is demanded with regard to the sheet P such as in 3D printing. In particular, in a case where it is necessary that an expensive specialist medium is used as the sheet P such as in 3D printing, it is not possible to ignore wasteful consumption of the sheet P due to printing being performed with deviations from an appropriate position with regard to the sheet P. In order to deal with this, skew with regard to the transport direction is detected in the sheet P which is transported to the recording unit 28 and the sheet P is discharged without performing printing with regard to the sheet P based on the detecting of skew. Here, there is a problem in that, using the method of detecting skew described above, it takes a long time from starting an operation in order to detect skew in the sheet P to starting printing when attempting to start printing with regard to the sheet P in a case where skew is not detected.

Therefore, skew is detected in the sheet P as follows in the printing apparatus 11 of the present embodiment. That is, the carriage 18 is moved to the first position P1 and the sheet P is transported to the recording unit 28 in this state each time that skew is detected in the sheet P. Then, when the front edge of the sheet P in the transport direction is detected by the second sensor 75, the carriage 18 is moved from the first position P1 to the second position P2, which is separated from the first position P1 by the regulating movement distance x, in a direction so that the second sensor 75 is no longer able to locate the sheet P. Furthermore, the sheet P is transported by the transport unit 27 to where the second sensor 75 locates the front edge of the sheet P in the transport direction at the second position P2. The controller 70 of the printing apparatus 11 determines the transport distance y of the sheet P due to the transport unit 27 from where the second sensor 75 locates the front edge of the sheet P in the transport direction at the first position P1 to where the second sensor 75 locates the front edge of the sheet P in the transport direction at the second position P2. Then, skew with regard to the transport direction is detected in the sheet P based on the transport distance y and the regulating movement distance x.

Here, the distance between the first position P1 and the second position P2 in the scanning direction of the carriage 18 is the regulating movement distance x. It is possible for the regulating movement distance x to be set to be a smaller value than the distance across the entire width of the sheet P in the scanning direction. By the regulating movement distance x being set in this manner, the time required for the carriage 18 to move from the first position P1 to the second position P2 is shortened. Furthermore, it is possible to start printing in the recording unit 28 by the sheet P being transported to the downstream side from the position of the sheet P when there is a case where skew with regard to the transport direction is not detected in the sheet P when the second sensor 75 locates the front edge of the sheet P in the transport direction in a state where the carriage 18 is displaced to the second position P2. In addition, the transport amount of the sheet P in the opposite direction (to the upstream side in the transport direction) in such a case is kept to a small amount even if it is necessary to return the sheet P to the position where recording starts which is to the upstream side in the transport direction. Due to this, it is possible to shorten the time from starting operating of the transport unit 27 and the carriage 18 in order to detect skew to starting recording with regard to the sheet P in a case where skew with regard to the transport direction is not detected in the sheet P.

Figure 7:
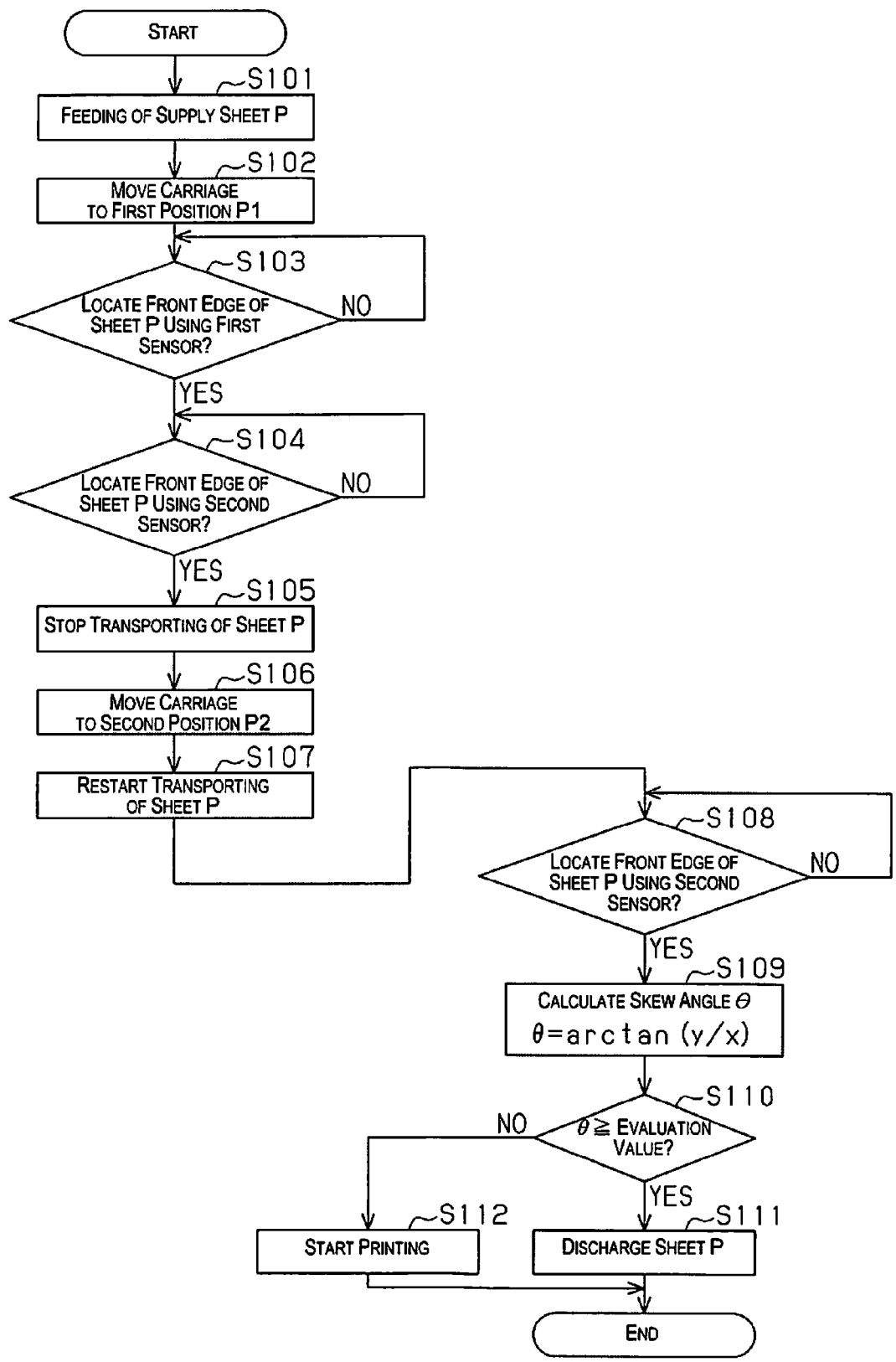
FIG. 7 is a flow chart illustrating a sequence for detecting skew in a sheet.

FIG. 7 is a flow chart illustrating a sequence for detecting skew with regard to the transport direction in the sheet P which is transported to the recording unit 28.

If supplying of the sheet P from the supply cassette 16 is performed in a process of step 101 (S101) in FIG. 7, the carriage 18 is moved to the first position P1 in a process of S102. Furthermore, it is determined whether or not the front edge of the sheet P, which is transported by the transport unit 27, in the transport direction is located by the first sensor 74 in a process of S103. If it is determined that the front edge is located, the controller 70 ascertains the position of the sheet P beyond this based on the position of the front edge of the sheet P, which is detected by the first sensor 74, in the transport direction.

The processes of S104 and beyond in FIG. 7 are in order for skew with regard to the transport direction to be detected in the sheet P which is transported to the recording unit 28. Before executing a series of processes, the controller 70 performs either of two types of operations shown as follows as (A) and (B) as an operation for eliminating skew in the sheet P in advance.

(A) In a state where rotating of the supply driving roller 34 is stopped, returning of the front edge of the sheet P in the transport direction is performed from a position of being pinched between the transport driving roller 37 and the transport driven roller 38 to a position further upstream than this position by the transport driving roller 37 being driven to rotate in the opposite direction to when transporting the sheet P. Due to this, the front edge of the sheet P which is pinched between the transport driving roller 37 and the transport driven roller 38 is discharged to the upstream side in the transport direction (the left side in FIG. 1) and the sheet P becomes warped. When the sheet P becomes warped in this manner, the front edge of the sheet P in the transport direction is rotated in reverse or collides with between the transport driving roller 37 and the transport driven roller 38 which have stopped and eliminating of skew with regard to the transport direction is achieved in the sheet P through this collision.

(B) There is a state where the supply driving roller 34 is driven to rotate in a forward direction which is the direction when the sheet P is transported and the transport driving roller 37 is driven to rotate in a reverse direction to when the sheet P is transported or the driving to rotate is stopped. Due to this, the front edge of the sheet P in the transport direction is rotated in reverse or collides with between the transport driving roller 37 and the transport driven roller 38 where the rotating has stopped and eliminating of skew with regard to the transport direction is achieved in the sheet P through this collision as described above. Here, it is preferable that the operation of (B) be adopted in a case where the sheet P is comparatively thick and hard such as with sheets for 3D printing.

After the operation for eliminating skew in the sheet P in advance is performed as described above, the controller 70 transports the sheet P toward the recording unit 28 using the transport unit 27. Then, the presence or absence of skew in the sheet P which is not quite eliminated in the operation described above is determined through the process of S104 and beyond in FIG. 7. It is firstly determined in this series of processes whether or not the front edge of the sheet P in the transport direction is located by the second sensor 75 in a process of S104. Here, if it is determined that the front edge is located, transporting of the sheet P by the transport unit 27 is stopped in a process of S105, and after this, the carriage 18 is moved to the second position P2 in a process of S106.

Figure 5:
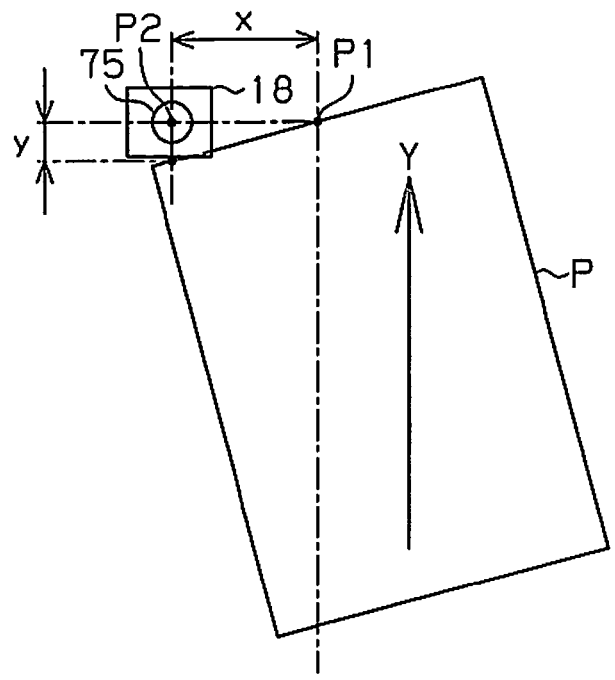
FIG. 5 is a rough diagram illustrating movement of a carriage and a sheet when detecting skew in a sheet.

The process of S106 is performed as follows by the controller 70. That is, the controller 70 moves the carriage 18 to one side in the scanning direction (the direction of the arrow X1 or the direction of the arrow X2 in FIG. 4). At this time, movement of the carriage 18 by the regulating movement distance x is performed in a case where the sheet P is not located by the second sensor 75, that is, in a case where the carriage 18 is moved in the direction of the arrow X1 in the example of FIG. 4. Due to this, the carriage 18 reaches the second position P2 as shown in FIG. 5.

On the other hand, the movement direction of the carriage 18 is reversed in a case where the sheet P continues to be located by the second sensor 75 when the carriage 18 is moved to one side in the scanning direction in FIG. 4 as described above. Here, the sheet P continues to be located by the second sensor 75 in a case where the carriage 18 is moved in the direction of the arrow X2 in the example of FIG. 4, that is, in a case where the carriage 18 is moved in the reverse direction to the second position P2. In this case, the controller 70 reverses the movement direction of the carriage 18 (reverses from the direction of the arrow X2 to the direction of the arrow X1 in the example of FIG. 4), and after this, performs movement of the carriage 18 by the regulating movement distance x. Due to this, the carriage 18 reaches the second position P2 as shown in FIG. 5.

Transporting of the sheet P using the transport unit 27 is started again in a process of S107 in a state where the carriage 18 is moved to the second position P2 through the process of S106 (FIG. 7) described above. Then, it is determined whether or not the second sensor 75 has located the front edge of the sheet P in the transport direction in a process of S108. If it is evaluated that the front edge is located, a skew angle θ of the sheet P with regard to the transport direction of the sheet P is found in a process of S109. In detail, the skew angle θ is calculated using the following equation "θ=arctan(y/x)" based on the transport distance y and the regulating movement distance x.

Next, it is determined whether or not the skew angle θ is equal to or more than an evaluation value in a process of S110. Here, it is conceivable that a value which is a permissible upper limit for the skew angle θ (for example 0.5°) where it is possible to appropriately execute 3D printing may be adopted as the evaluation value which is used here. Then, it is determined that the skew angle θ is equal to or more than the evaluation value in S110 in a case where the skew angle θ is the same as "+0.5°" or is large in the positive direction. In addition, it is determined that the skew angle θ is equal to or more than the evaluation value in S110 also in a case where the skew angle θ is the same as "−0.5°" or is large in the negative direction.

It is determined that there is skew in the sheet P in a case where it is determined that the skew angle θ is equal to or more than the evaluation value in S110 and the sheet P is discharged to the stacker 23 by being transported by the transport unit 27 in a process of S111 without printing using the recording unit 28 being performed with regard to the sheet P. On the other hand, printing using the recording unit 28 is started with regard to the sheet P in a process of S112 in a case where it is determined that the skew angle θ is not equal to or more than the evaluation value in S110.

Here, in a case where there is hardly any skew in the sheet P (in a case where the skew angle θ is approximately 0°), there is a possibility that there will be no changes in the state of the second sensor 75 carrying out locating even when the carriage 18 is moved in either direction of the direction of the arrow X1 or the direction of the arrow X2 in the process of S106. In this case, it is determined that there is no skew in the sheet P and printing is started with regard to the sheet P.

Next, the following items [A] to [C] will be individually described in detail in relation to the printing apparatus 11. [A] storing of the offset amount of the second sensor 75 in the carriage 18 with regard to the nozzles in the recording head 20 in the scanning direction. [B] ensuring locating sensitivity when the second sensor 75 has deteriorated. [C] improving ink landing accuracy with regard to the sheet P according to the skew angle θ.

[A] The controller 70 of the printing apparatus 11 ejects ink droplets from the nozzle in the recording head 20 while the carriage 18 is appropriately moved in the scanning direction so as to perform printing with regard to the sheet P. The timing for starting ejecting of ink droplets from the nozzles at this time is set with an edge of the sheet P, which is located by the second sensor 75, in the scanning direction as a reference. The controller 70 stores an offset amount ΔX of the second sensor 75 with regard to the nozzles of the recording head 20 in the scanning direction and determines the timing for starting ejecting of ink droplets from the nozzles with regard to the sheet P based on the offset amount ΔX with the edge of the sheet P in the scanning direction as a reference.

Figure 8:
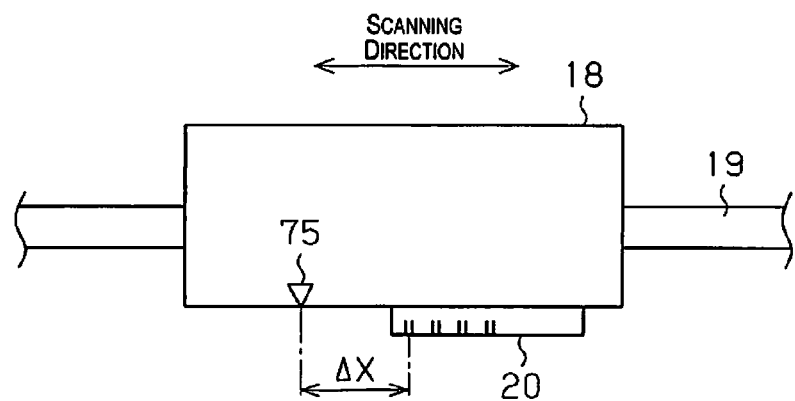
FIG. 8 is a rough diagram for explaining the relationship between an offset amount $\Delta X$ and a position for starting ejecting of ink droplets with regard to a sheet P.
Figure 9:
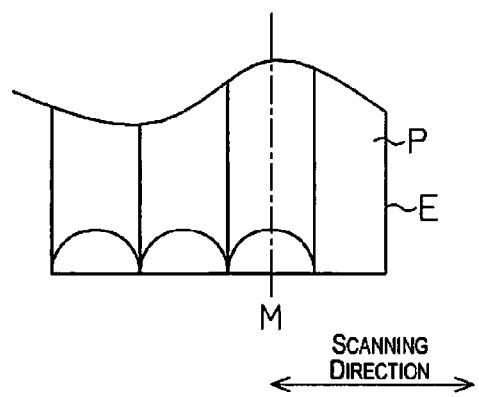
FIG. 9 is a rough diagram for explaining the relationship between an offset amount $\Delta X$ and a position for starting ejecting of ink droplets with regard to a sheet P.

FIG. 8 and FIG. 9 are rough diagrams for explaining the relationship between the offset amount ΔX and a position for starting ejecting of ink droplets with regard to the sheet P.

If a case is assumed where the offset amount ΔX which is stored by the controller 70 deviates from the actual value due to an error in manufacturing the printing apparatus 11 or the like, there is a concern that the timing for starting ejecting of ink droplets from the nozzles with regard to the sheet P will deviate from the appropriate timing. That is, after an edge E of the sheet P in the scanning direction is detected by the second sensor 75, the location where ejecting ink droplets from the nozzle is started is found so that the ink droplets land in a middle M of a lens above the sheet P in consideration of the offset amount ΔX with the edge E as a reference in a case of the sheet P for 3D printing. However, it is difficult to start ejecting of ink droplets from the nozzles so that the ink droplets land in the middle M of the lens above the sheet P when the offset amount ΔX which is stored by the controller 70 deviates from the actual value.

In order to deal with this, it is preferable for the offset amount ΔX which is based on the actual value to be stored by the controller 70 using the following sequences A1 to A3 in a process for manufacturing the printing apparatus 11.

Figure 10:
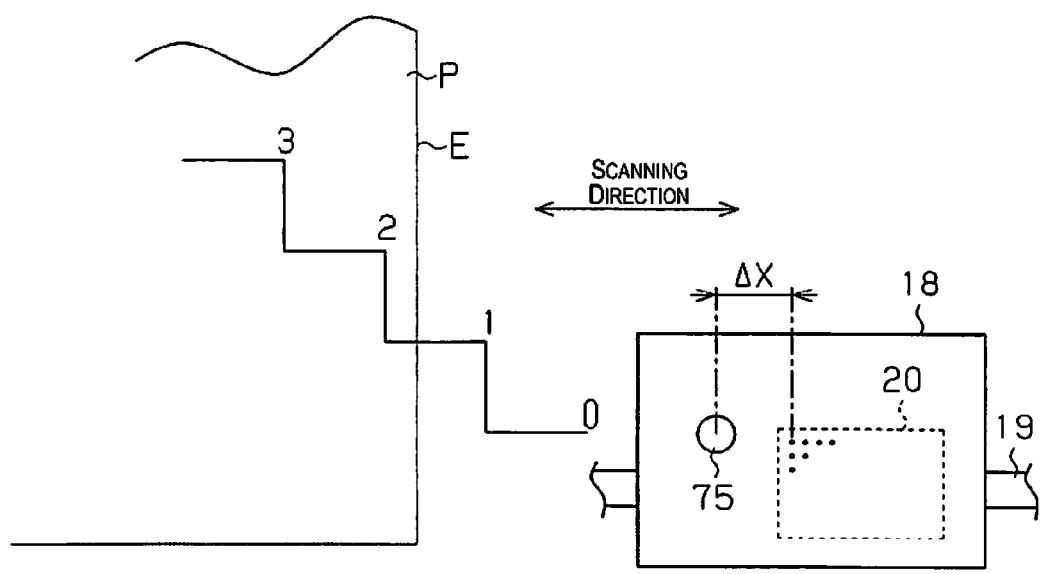
FIG. 10 is a rough diagram for explaining a sequence for setting an offset amount $\Delta X$.

Printing of an image in a shape with stages is performed with regard to the sheet P for adjusting (for example, glossy paper which is specialized for adjusting) with a low resolution using the printing apparatus 11 in the sequence A1 as shown in FIG. 10. In detail, the controller 70 moves the carriage 18 in the scanning direction toward the edge E of the sheet P, starts ejecting of ink droplets from the nozzles in the recording head 20 at an arbitrary position "0" in front of the edge E, and after this, performs printing of an image with a shape with stages which is shown in the diagram through ejecting ink droplets. It is conceivable that a low resolution such as, for example, 1/360 dpi may be adopted as the resolution at this time. Then, it is ascertained which number stage is the stage section, which is closest to the edge E, out of the stage sections (diagram of stages 1 to 3 in the example) in the image with a shape with stages based on locating of the edge E by the second sensor 75, the distance between this stage section and the position "0" in the scanning direction is found, and this distance is set as a temporary set value for the offset amount ΔX.

Printing of the image with a shape with stages is performed with regard to the sheet P using the printing apparatus 11 in the sequence A2 in the same manner as the sequence A1 at a high resolution (for example, 1/1440 dpi) using the offset amount ΔX which is set in the sequence A1. The controller 70 ascertains which number stage is the stage section, which is closest to the edge E, out of the plurality of stage sections in the image with a shape with stages which is to be printed, finds the distance between this stage section and the position "0" in the scanning direction, and sets this distance as a new temporary set value for the offset amount ΔX.

The sequence A1 and the sequence A2 are repeatedly performed at three other locations on the sheet P and a total of four of the temporary set values for the offset amount ΔX are acquired in the sequence A3. Then, an average value, which is acquired by averaging the four temporary set values, is set as the proper offset amount ΔX. The controller 70 stores the proper offset amount ΔX which is set in this manner and performs printing (ejecting of ink droplets) after this based on the offset amount ΔX which is stored. Here, it is preferable for the four corners of the sheet P, that is, a right edge section and a left edge section which are upstream in the transport direction of the sheet P in addition to a right edge section and a left edge section which are downstream in the transport direction of the sheet P, to be used as the locations in the sheet P where the sequence A1 and the sequence A2 are performed so as to acquire the temporary set values of the offset amount ΔX.

Even in printing which demands high precision such as 3D printing, it is possible to satisfy these demands by storing the proper offset amount ΔX which is set as above in the controller 70 and performing printing based on the offset amount ΔX which is stored. In addition, it is possible to efficiently carry out the sequence A2 in comparison to a case where the sequence A1 is not performed by performing the sequence A1 before performing the sequence A2.

[B] It is conceivable that a sensor which performs emission of light toward the sheet P while receiving light which is reflected light from the sheet P and performing locating of the sheet P based on the amount of received light at this time may be applied as the second sensor 75. Here, in the second sensor 75 which is conceived in this manner, since there is a tendency for a reduction in the amount of light emitted due to deterioration and a tendency for the reduction in the amount of light emitted to reduce the amount of light received which is reflected light from the sheet P, there is a link with a reduction in accuracy when the second sensor 75 locates the edge of the sheet P. As a result, in 3D printing and the like where printing with high precision is demanded with regard to the sheet P, there is a concern that it will not be possible to satisfy the demands of printing accuracy with regard to the sheet P due to the reduction in the accuracy of the second sensor 75 locating the edge of the sheet P.

In order to deal with this, it is preferable that the amount of light emitted be adjusted according to deterioration in the second sensor 75 in accordance with the following sequences B1 to B4, and due to this, reduction in accuracy of the second sensor 75 locating the edge of the sheet P be suppressed.

In the sequence B1, the controller 70 positions the second sensor 75 above the sheet P by transporting the sheet P to the downstream side in the transport direction in a state where the carriage 18 is at the second position P2 after the process for detecting skew in the sheet P is executed.

In the sequence B2, the controller 70 adjusts the amount of light emitted so that a detection voltage which is reduced in accordance with an increase in the amount of light received is a predetermined value (for example, 0.4 V) in the second sensor 75 which is positioned above the sheet P and stores the amount of light emitted when the detection voltage is the predetermined value.

In the sequence B3, the controller 70 moves the carriage 18 from the second position P2 to the first position P1 and adjusts the amount of light emitted in the second sensor 75 at this position in the same manner as the sequence B2. Then, the amount of light emitted when the detection voltage of the second sensor 75 is the predetermined value is stored.

In the sequence B4, the controller 70 sets an average value of the amounts of light emitted which are each stored in the sequence B2 and the sequence B3 as a new amount of light emitted in the second sensor 75. Due to this, in the locating of the edge of the sheet P by the second sensor 75 which is performed after this, emitting of light is performed with regard to the sheet P with the amount of emitted light which is newly set as described above.

Here, adjusting of the amount of light emitted in the second sensor 75 according to the sequences B1 to B4 described above need only be performed when performing printing with high precision with regard to the sheet P such as with 3D printing. In this case, adjusting of the amount of light emitted in the second sensor 75 according to the sequences B1 to B4 is not performed when printing with high precision is not necessary such as for printing when the sheet P is normal paper and emitting of light is performed with the standard amount of light emitted.

[C] While printing is started with regard to the sheet P in a case where skew is not detected in the sheet P with the skew angle θ in the sheet P being less than the evaluation value, it is undeniable that the accuracy of ink droplets landing with regard to the sheet P is reduced by the amount of the skew angle θ. Then, there is a negative effect on printing due to a reduction in accuracy of ink droplets landing in this manner in a case where printing is performed with regard to the sheet P for 3D printing. As a result, it is preferable that countermeasures be taken for realizing effective printing by achieving an improvement in accuracy of ink droplet landing with regard to the sheet P when the skew angle θ is larger than "0" in a case of performing printing with regard to the sheet P for 3D printing. As such a countermeasure, it is conceivable to shift the timing of ejecting ink droplets from the nozzles so that the image which is printed on the sheet P is tilted by the skew angle θ in the same manner as the sheet P by ejecting ink droplets from the nozzles in the recording head 20.

Here, nozzle rows are formed by lining up the nozzles in the recording head 20 in the transport direction of the sheet P (the up and down direction in the diagram) as shown in FIG. 10 and a plurality of the nozzles rows such as these being formed to line up in the scanning direction of the carriage 18. In addition, for example, a lens sheet where an ink absorbing layer is bonded to a bottom surface of a lenticular lens is used as the sheet P in 3D printing as shown in FIG. 9. Transporting of the sheet P is performed in a state where the lens (for example, a cylindrical lens) above the sheet P extends in the transport direction (the up and down direction in FIG. 9) as shown in FIG. 9, that is, in a state where the nozzle rows shown in FIG. 10 extend in parallel. If a case is assumed where the skew angle θ is "0", it is possible for ink droplets to land with regard to the middle M of the lens above the sheet P and it is possible to print without the image being tilted with regard to the sheet P by the ink droplets being ejected at the same time from each of the nozzles in the nozzle rows. On the other hand, in a case where the skew angle θ is larger than "0", it is possible for ink droplets to land with regard to the middle M of the lens above the sheet P which is tilted by the skew angle θ and it is possible to print with the image being tilted by the skew angle θ with regard to the sheet P by the timing for ejecting ink droplets from the nozzles in one of the nozzle rows being gradually shifted for each of the nozzles according to the skew angle θ.

Here, it is possible for the timing for ejecting ink droplets from the nozzles in one of the nozzle rows which is gradually shifted for each of the nozzles according to the skew angle θ to be realized through setting a delay in the timing of ejecting ink droplets for each of the nozzles according to the skew angle θ. In addition, it is possible for the timing for ejecting ink droplets from the nozzles in one of the nozzle rows being gradually shifted for each of the nozzles according to the skew angle θ to be realized in the following manner. That is, for example, an image which is based on the printing job data which is transmitted from the host apparatus 71, that is, an original image for performing printing with regard to the sheet P, is tilted by the skew angle θ. In this case, it is possible to shift the timing for ejecting ink droplets from each of the nozzles in one of the nozzle rows as described above in order for ink droplets to be ejected from each of the nozzles in the nozzles rows of the recording head 20 based on the original image which is tilted by the skew angle θ.

According to the present embodiment described above, it is possible to obtain the effects which are shown below.

(1) It is possible to shorten the time from starting operating of the transport unit 27 and the carriage 18 in order to detect skew to starting printing with regard to the sheet P in a case where skew with regard to the transport direction is not detected in the sheet P which is transported to the recording unit 28.

(2) There is a possibility that, when the carriage 18 is moved from the first position P1 to the second position P2 in the scanning direction, the carriage 18 which is at the first position P1 will be initially moved in the opposite direction to the second position P2 in order for skew with regard to the transport direction to be detected in the sheet P. The sheet P continues to be located by the second sensor 75 after moving of the carriage 18 starts in the opposite direction to the second position P2 in a case where the sheet P is skewed with regard to the transport direction. The carriage 18 is set to face toward the second position P2 by the movement direction of the carriage 18 being reversed when the sheet P continues to be located by the second sensor 75 in this manner. Due to this, it is possible to detect skew in the sheet P by reversing the movement direction of the carriage 18 after this even when the carriage 18 is moving in the opposite direction from the first position P1 to the second position P2. At this time, it is possible to suppress wasteful movement of the carriage 18 as much as possible when moving from the first position P1 to the second position P2 if the movement direction of the carriage 18, which is going to move in the opposite direction to the second position P2, is immediately reversed to face toward the second position P2.

(3) The skew angle θ with regard to the transport direction is found in the sheet P based on the transport distance y and the regulating movement distance x. It is determined that there is skew in the sheet P based on whether the skew angle θ is equal to or more than the evaluation value. In other words, skew with regard to the transport direction is detected in the sheet P based on the whether the skew angle θ is equal to or more than the evaluation value. Here, the evaluation value is set to a permissible upper limit for the skew angle θ where it is possible for 3D printing to be appropriately executed. Then, the transport unit 27 is operated so that the sheet P is discharged in the transport direction when skew is detected in the sheet P as described above. Accordingly, it is possible for the sheet P to be discharged in the transport direction when skew in the sheet P is large enough to impede 3D printing with regard to the sheet P. Accordingly, it is possible to avoid wasteful consumption of the sheet P due to performing 3D printing with regard to the sheet P which is skewed.

(4) The regulating movement distance x for determining the second position P2 is set to a value which is shorter than the distance from the first position P1 to an edge of the sheet P in the scanning direction (an edge in the direction of the arrow X1 in this example) so that the carriage 18 is as close to the edge as possible. It is preferable for the regulating movement distance x to be as large as possible such that the skew angle θ is found with high precision based on the regulating movement distance x and the like. It is possible for the regulating movement distance x to be as large as possible when setting the regulating movement distance x as described above and it is possible to find the skew angle θ with high precision. Here, movement of the carriage 18 (the second sensor 75) in the scanning direction with the aim of detecting the sheet size in order to determine the second position P2 is no longer necessary if there is a configuration where the second position P2 is determined according to the sheet size in the printing conditions information.

Second Embodiment

A second embodiment will be described next while referring to FIG. 11 to FIG. 19. The present embodiment is an example where it is possible to ensure high skew detection precision even if a portion of the support platform 39, which is an example of the support section which is hit with light which is irradiated from the second sensor 75, is a shape with a concave and convex surface where the amount of light received by the second sensor 75 is different according to the position where the light hits in a case where the sheet P is not present in the detecting region of the second sensor 75.

Figure 11:
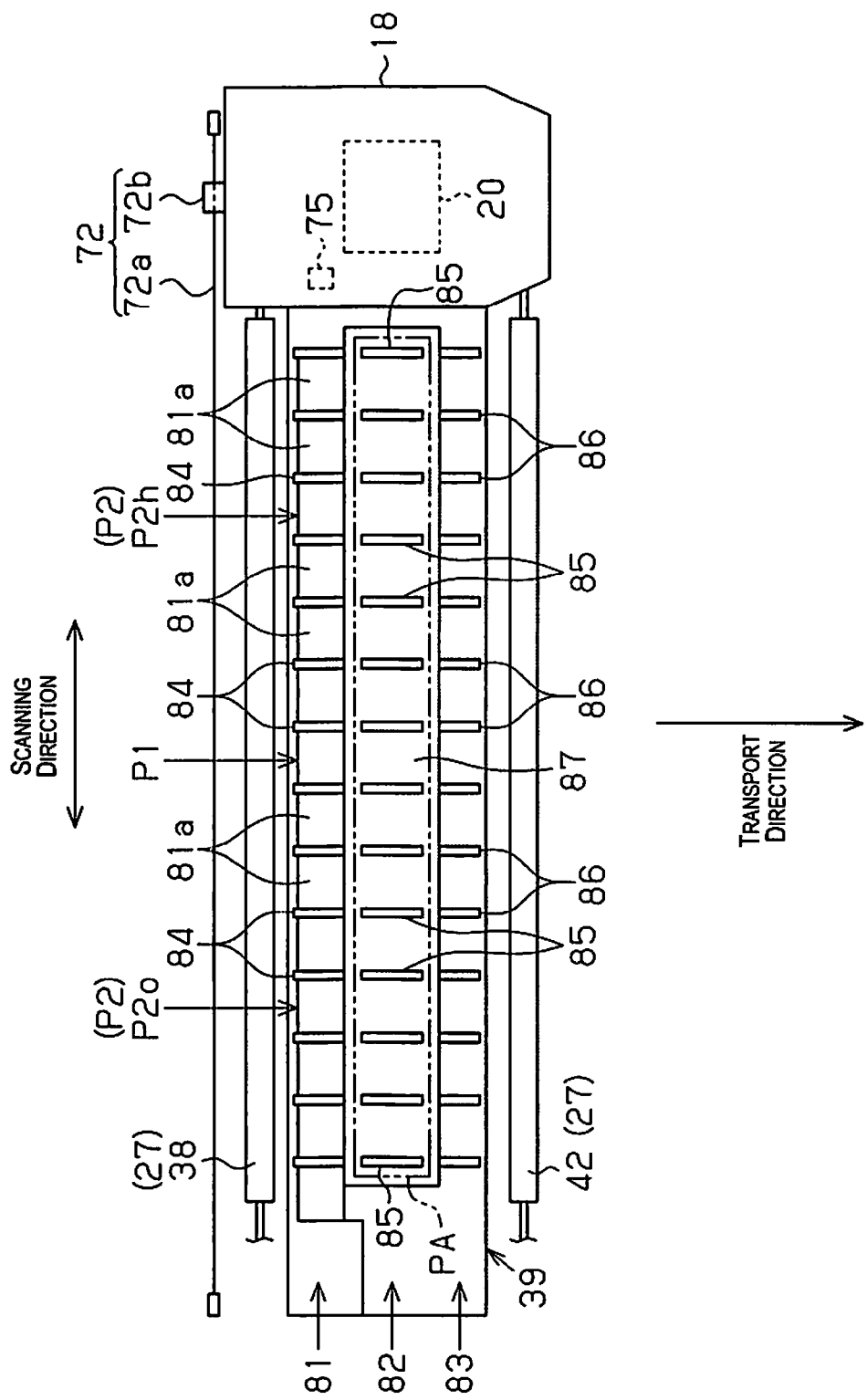
FIG. 11 is a planar diagram illustrating the surroundings of a recording unit in a printing apparatus.

As shown in FIG. 11, the support platform 39 which is provided in the printing apparatus 11 extends lengthwise along the transport path of the carriage 18 (the scanning direction) and supports a specific range of the sheet P which includes a portion which corresponds to a printing region PA where ejecting of liquid is performed by the recording head 20. The support platform 39 has an upstream side support surface section 81 which is positioned on the upstream side in the transport direction, a middle support surface section 82 which is positioned on the downstream side in the transport direction with regard to the upstream side support surface section 81, and a downstream side support surface section 83 which is positioned on the downstream side in the transport direction with regard to the middle support surface section 82. The printing region PA is arranged at the middle support surface section 82.

As shown in FIG. 11, a plurality of first ribs 84, which protrude to the upper side in the vertical direction (a front side in the surface of the paper in FIG. 11) and extend along the transport direction, are formed in the upstream side support surface section 81 with predetermined intervals in the scanning direction. In addition, a plurality of second ribs 85, which protrude to the upper side in the vertical direction and extend along the transport direction, are formed in the middle support surface section 82 with constant intervals in the scanning direction. Furthermore, a plurality of third ribs 86, which protrude to the upper side in the vertical direction and extend along the transport direction, are formed in the downstream side support surface section 83 with constant intervals in the scanning direction. The sheet P (refer to FIG. 1) is transported in the transport direction in a state where the rear surface of the sheet P is supported by the first to third ribs 84 to 86.

In addition, as shown in FIG. 11, an ink absorbing material 87 with a four-corner plate shape, which is long in the scanning direction and includes the printing region PA, is provided in the middle support surface section 82. The ink absorbing material 87 has functions such as absorbing of ink which has, for example, been ejected and has landed to protrude to the outside of the sheet P when printing without margins. The sheet P is supported in a state of being upwardly separated from the surface of the ink absorbing material 87 due to the plurality of second ribs 85.

As shown in FIG. 11, a portion of the upstream side support surface section 81 other than the first ribs 84 is a concave section 81a which has a bottom surface which is lower than the top surface (upper edge surface) of the first ribs 84. The bottom surface of the concave section 81a is the concave and convex surface 81b (refer to FIG. 12) as will be described later. On the other hand, the second sensor 75 is provided in the carriage 18 in a state of being arranged at a position which corresponds to the upstream side support surface section 81 in the transport direction. As a result, the second sensor 75 receives light reflected from the upstream side support surface section 81 when an operation where skew is detected in a sheet in a state where a sheet is not present on the upstream side support surface section 81. Here, the linear encoder 72 has a coding plate 72a which has a plurality of slits which are opened with a constant pitch along the scanning direction and a sensor 72b which receives light, which is irradiated from a projecting section and has passed through the slits, using a light receiving section.

Figure 12A:
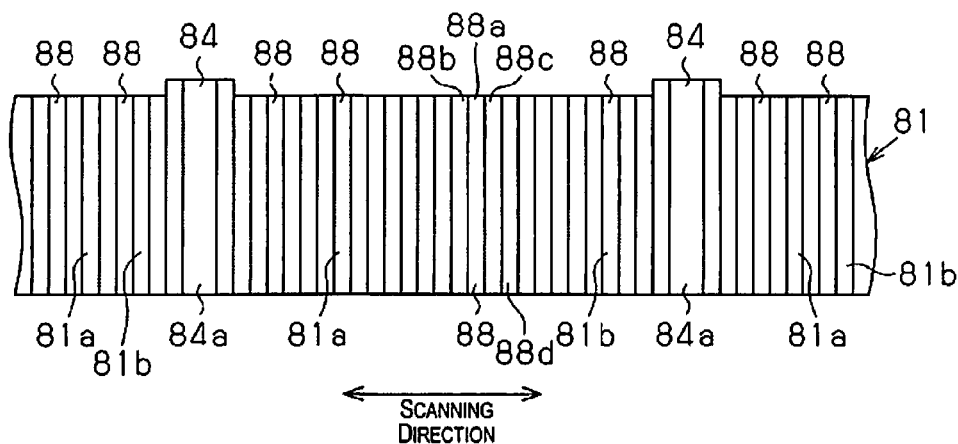
FIG. 12A is a partial planar diagram of the upstream side of a support surface section.
Figure 12B:
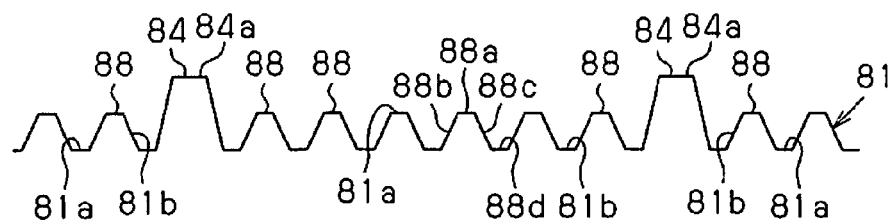
FIG. 12B is a partial side surface diagram of the support surface section.

As shown in FIGS. 12A and 12B, a plurality of convex sections 88 (ribs) which are lower than the height of the first ribs 84 are arranged at the bottom surface of the concave section 81a in the upstream side support surface section 81 with a constant pitch in the scanning direction. As shown in FIG. 12B, a side surface view of the convex sections 88 from the transport direction is a trapezoidal shape and the convex sections 88 have top surfaces 88a (upper edge surfaces) with the highest height and two inclined surfaces 88b and 88c which extended diagonally with a constant angle on both sides of the top surfaces 88a in the scanning direction and where each orientation of the inclinations is different. Then, bottom surfaces 88b which have the lowest height are positioned between the convex sections 88. In this manner, the bottom surface of the concave section 81a is the concave and convex surface 81b due to there being the plurality of convex sections 88 as shown in FIGS. 12A and 12B.

As a result, there is a tendency for light which is irradiated from the second sensor 75 onto the concave section 81a to be diffusely reflected due to the concave and convex surface 81b and the amount of light which is incident onto the second sensor 75 is relatively low. In contrast with this, light reflectivity of the sheet P is relatively high compared to the light reflectivity of the concave section 81a. As such, for the second sensor 75, the concave section 81a is a dark region and the sheet P is a bright region. As a result, it is easy for there to be differences in the amount of reflected light which returns to the second sensor 75 at both sides of the boundary between the sheet P and the upstream side support surface section 81 when the front edge of the sheet P reaches inside the locating region (light spot) of the second sensor 75 and it is possible to detect the front edge of the sheet P in the transport direction with comparatively high precision.

In addition, the top surfaces 84a of the first ribs 84 have mirror surfaces due to being gradually polished by rubbing against the sheets P. As a result, light reflectivity of the top surfaces 84a changes to the side of gradually increasing until the surfaces are mirrors. It is not preferable that a light spot SP hit the first ribs 84 where light reflectivity has changed in this manner when detecting the front edge of the sheet P in consideration of acquiring a transport amount which is accurate. Therefore, in the present embodiment, the light spot SP of the second sensor 75 hits the concave section 81*a* where the height is lower than the first ribs 84, rubbing against the sheets P does not occur, and changes in light reflectivity are relatively low. As a result, the first position P1, the second position P2 on the home position side (referred to below as "P2*h*"), and the second position P2 on the opposite side to the home position (referred to below as "P2*o*"), which are positions where the second sensor 75 is arranged in a case where an operation for detecting skew in the sheet P is performed, are set to be in an area in the concave section 81*a*.

The amount of light received in the second sensor 75 differs depending on whichever surface out of the three surfaces 88*a* to 88*c* in the convex sections 88 and the bottom surfaces 88*d* is hit by the center of the light spot which is irradiated from the second sensor 75 onto the concave section 81*a* when detecting skew in the sheet P. That is, the output value of the second sensor 75 differs depending on whichever surface out of the four surfaces 88*a* to 88*d* is hit by the center of the light spot from the second sensor 75. Here, the second sensor 75 in the present embodiment is configured so that the output value is larger when the amount of light received is small due to the light spot hitting a dark region such as the concave section 81*a* and the output value is small when the amount of light received is large due to the light spot hitting a bright region such as the sheet P. It is obvious that the second sensor 75 may be configured so that the output value is higher as amount of light received is larger.

Figure 13:
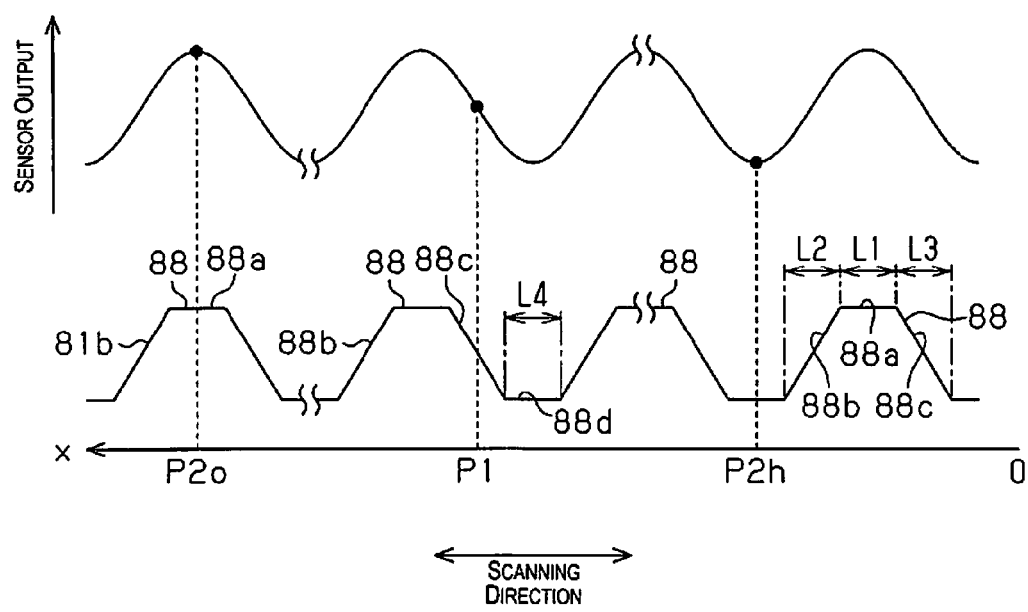
FIG. 13 is an explanatory diagram illustrating output of a sensor in a case where each of the positions during detecting of skew are positions where the shapes of a convex and concave surface are different.

In the present example, when the width of the top surfaces 88*a* is L1, the projection width of the inclined surfaces 88*b* in the scanning direction is L2, the projection width of the inclined surfaces 88*c* in the scanning direction is L3, and the width of the bottom surfaces 88*d* is L4, L1=L2=L3=L4 as an example as shown in FIG. 13. For example, L1 which is the width of the top surfaces 88*a* is a value within a range of 0.1 mm to 2 mm (0.5 mm as an example). In addition, the diameter of the light spot of the second sensor 75 is larger than L1 which is the width of the top surfaces 88*a* and is a value within a range of, for example, 0.5 mm to 5 mm (2 mm as an example). Furthermore, the distance between a nozzle forming surface where the nozzles are opened in the recording head 20 and a support surface where the sheet P is placed on the support platform 39 (the top surfaces of the ribs 85 in the example) changes according to the type of the sheet P but are set to a value within a range of 1 mm to 3 mm (2 mm as an example) in a case of the sheet P which is the target for detecting skew in the present embodiment.

As a result, the top surface 88*a* and the inclined surfaces 88*b* and 88*c* are included in the light spot in a case where the center of the light spot matches with the center of the width of the top surface 88*a*. It is obvious that the relationship between the light spot diameter D and the width L1 may be D≤L1. Here, the respective widths L1 to L4 of each of the surfaces 88*a* to 88*d* in the scanning direction may be all different or some may be different and the rest may be the same.

Figure 14A:
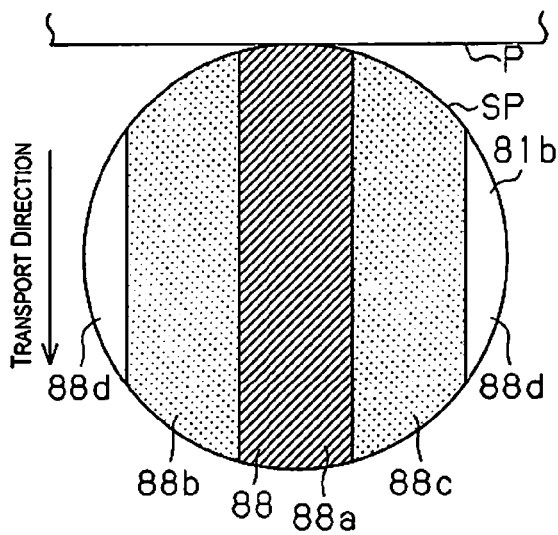
FIG. 14A is a schematic diagram illustrating the appearance of a light spot before entering of a sheet in a case where the center of the light spot is positioned on a top surface of a convex section.
Figure 14B:
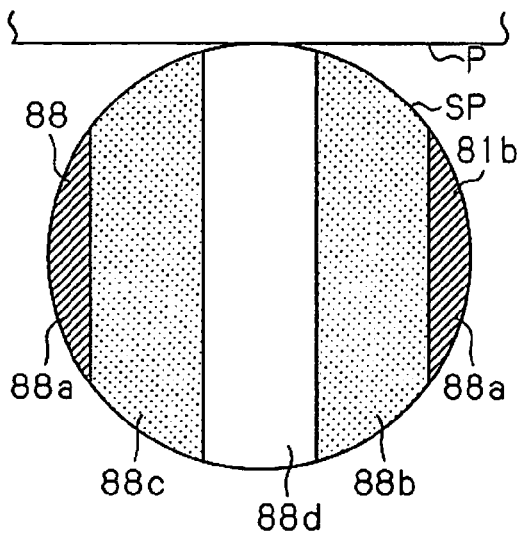
FIG. 14B is a schematic diagram illustrating the appearance of a light spot before entering of a sheet in a case where the center of the light spot is positioned on a bottom surface of a convex section.

As shown in FIGS. 14A and 14B, all of the plurality of the surfaces 88*a* to 88*d* of the convex section 88 are included within the light spot SP of the second sensor 75 in an example where D=4L1. The top surface 88*a*, the inclined surfaces 88*b* and 88*c* on both sides, and some of the bottom surface 88*d* are included within the light spot SP in a case where, for example, the center of the light spot SP is positioned at the top surface 88*a* as shown in FIG. 14A. In addition, the bottom surface 88*d*, the inclined surfaces 88*b* and 88*c* on both sides, and some of the top surface 88*a* are included within the light spot SP in a case where, for example, the center of the light spot SP is positioned at the bottom surface 88*d* as shown in FIG. 14B.

The position of the black dot in the graph of the sensor output in FIG. 13 indicates the center position of the light spot SP of the second sensor 75. As shown in FIG. 13, the amount of reflected light which is received in the second sensor 75 is relatively small and the sensor output value is relatively large in a case where the center of the light spot SP is positioned at the top surface 88*a* of the convex section 88 (which is equivalent to FIG. 14A). In contrast to this, the amount of reflected light which is received in the second sensor 75 is relatively large and the sensor output value is relatively small in a case where the center of the light spot SP is positioned at the bottom surface 88*d* (which is equivalent to FIG. 14B). This is because the amount of reflected light in the second sensor 75 is relatively large due to light which is incident onto the second sensor 75 by the light which is reflected by the inclined surface 88*b* being reflected again by the opposing inclined surface 88*c*. In addition, in a case where the center of the light spot SP is positioned at the inclined surface 88*c* (or 88*b*), the amount of reflected light which is received in the second sensor 75 is an intermediate amount of a case where the center of the light spot is at the top surface 88*a* and a case where the center of the light spot is at the bottom surface 88*d* and the sensor output value is an intermediate value in between these cases.

The position which is hit by the light spot SP of the second sensor 75 in this manner moves on the concave and convex surface 81*b* of the concave section 81*a* in accordance with the movement of the carriage 18 in the scanning direction and the sensor output is a waveform signal which cyclically changes according to the shape of the convex sections 88 as shown in FIG. 13. Then, the sensor output changes depending on the positioning of the center of the light spot SP of the second sensor 75 on whichever surface of the four surfaces 88*a* to 88*d*.

The output value of the second sensor 75 differs in cases where, for example, the surfaces where the surface, where the center of the light spot is positioned, differs between the four surfaces 88*a* to 88*d* at the first position P1 and the second position P2*o* (or P2*h*). In this case, irregularities are generated in the transport amount which is necessary in order to transport the sheet P until the sheet P reaches a threshold where the sensor output value determines that there is a sheet.

Figure 16:
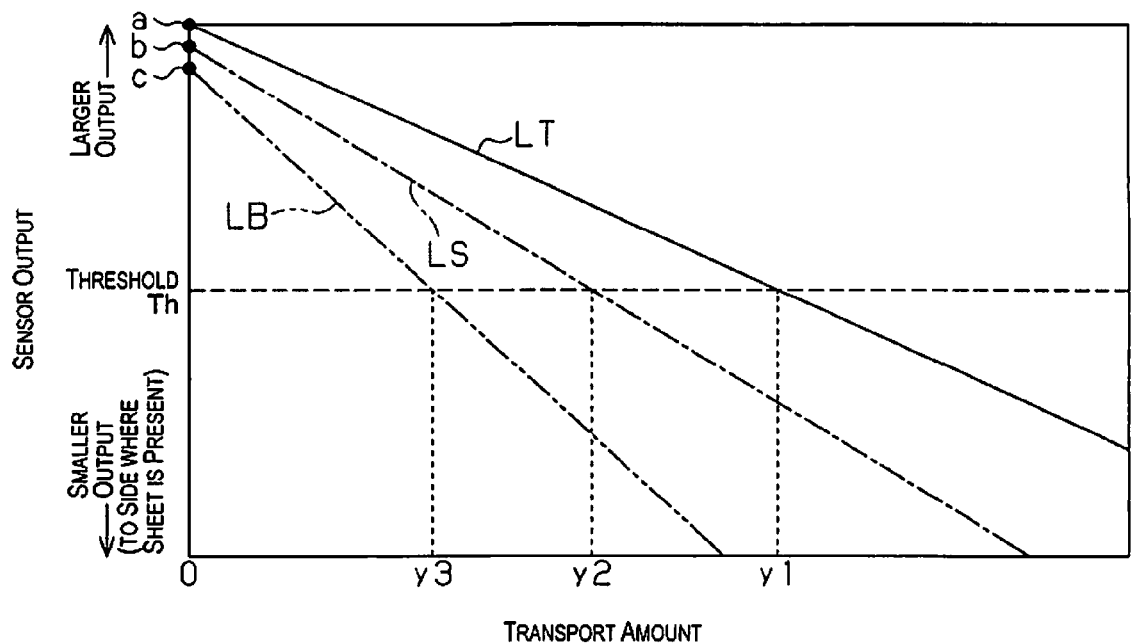
FIG. 16 is a graph illustrating the relationship between the output of a sensor and the transport amount for a sheet which enters into a light spot until the front edge of the sheet is located in a case where the center of the light spot is at a position where the shapes of the convex and concave surface are different.

FIG. 16 is a graph illustrating the relationship between the output of the second sensor 75 and the transport amount (feeding amount) for the sheet P which enters into the light spot SP in a process where the second sensor 75 locates the front edge of the sheet P by the sheet P being transported from a state where the second sensor 75 irradiates light onto the upstream side support surface section 81. In this graph, the position, when the light spot SP of the second sensor 75 only hits the concave and convex surface 81*b* of the concave section 81*a* and the front edge of the sheet P is not in contact with the light spot SP, is a reference position where the transport amount is "0" as an example as shown in FIGS. 14A and 14B. The graph in FIG. 16 shows the relationship of the sensor output and the transport amount for the sheet P to enter into the light spot SP from the reference position in the respective cases where the center of the light spot SP is positioned at the top surface 88*a* (FIG. 14A), the inclined surfaces 88*b* and 88*c*, and the bottom surface 88*d* (FIG. 14B) of the convex section 88.

In the graph in FIG. 16, the solid line indicates a graph line LT which shows the relationship of the sensor output and the transport amount in the case where the center of the light spot is positioned at the top surface 88a, the one-dot chain line indicates a graph line LS which shows the relationship of the sensor output and the transport amount in the case where the center of the light spot is positioned at the inclined surfaces 88b and 88c, and a two-dot chain line indicates a graph line LB which shows the relationship of the sensor output and the transport amount in the case where the center of the light spot is positioned at the bottom surface 88d. In addition, the thick broken line in the graph in FIG. 16 is a threshold Th which is where the second sensor 75 locates the sheet P. The controller 70 determines that the sheet P is located when the output value which is input from the second sensor 75 reaches the threshold Th.

As shown in FIG. 16, the transport amount for the sheet P from the reference position (transport amount of "0"), which is necessary for the sensor value to reach the threshold Th, increases when the location, where the center of the light spot SP is positioned, changes in order of the top surface 88a (the solid line), the inclined surfaces 88b and 88c (the one-dot chain line), and the bottom surface 88d (the two-dot chain line). This is due to the following reason.

As shown in FIG. 14A, a sensor output value a is relatively large as shown in FIG. 16 since it is relatively dark in the light spot SP in a case where the center of the light spot SP is at the top surface 88a of the convex section 88. In addition, as shown in FIG. 14B, a sensor output value c is relatively small as shown in FIG. 16 since it is relatively bright in the light spot SP in a case where the center of the light spot SP is at the bottom surface 88d of the convex section 88. Furthermore, a sensor output value b is a value between the sensor output value a and the sensor output value c as shown in FIG. 16 since the center of the light spot SP is at either of the inclined surfaces 88b and 88c of the convex section 88.

Figure 15A:
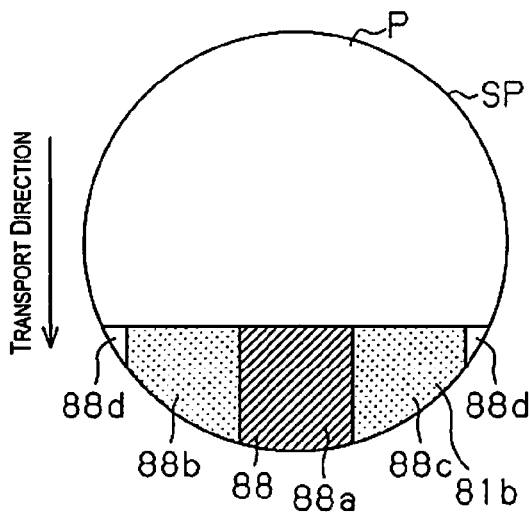
FIG. 15A is a schematic diagram illustrating the appearance of a light spot during locating of a sheet in a case where the center of the light spot is positioned on a top surface of a convex section.
Figure 15B:
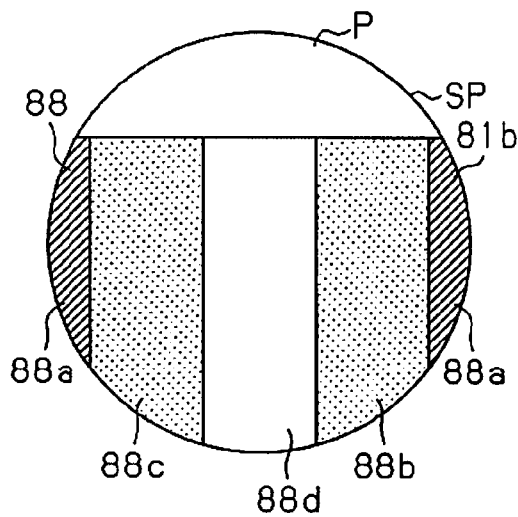
FIG. 15B is a schematic diagram illustrating the appearance of a light spot during locating of a sheet in a case where the center of the light spot is positioned on a bottom surface of a convex section.

FIG. 15A shows the appearance within the light spot SP when the sensor output reaches the threshold Th in a case where the center of the light spot SP is at the top surface 88a of the convex section 88 and FIG. 15B shows the appearance within the light spot SP when the sensor output reaches the threshold Th in a case where the center of the light spot SP is at the bottom surface 88d of the convex section 88. The proportion which is necessary to be taken up in the light spot SP until the sensor output value reaches the threshold Th is relatively large in the sheet P with a high light reflectivity as shown in FIG. 15A since it is relatively dark in the light spot SP (small amount of light reflected) in a case where the center of the light spot SP is positioned at the top surface 88a as shown in FIG. 14A. As a result, the transport amount for the sheet P, which is necessary for the sensor output value to reach the threshold, is relatively large.

On the other hand, the proportion which is necessary to be taken up in the light spot SP until the sensor output value reaches the threshold Th is relatively small in the sheet P as shown in FIG. 15B since it is relatively bright in the light spot SP (large amount of light reflected) in a case where the center of the light spot SP is positioned at the bottom surface 88d as shown in FIG. 14B. As a result, the transport amount for the sheet P, which is necessary for the sensor output value to reach the threshold Th, is relatively small.

Figure 17:
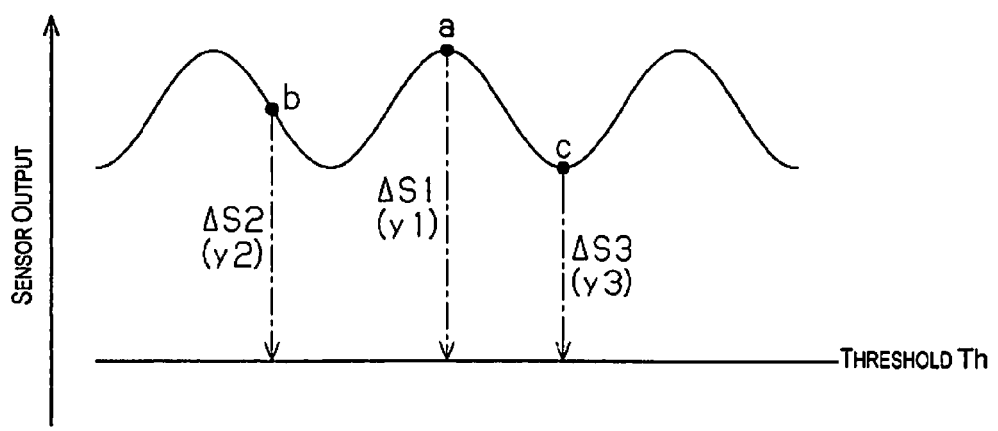
FIG. 17 is a graph illustrating the appearance of changes until the output of a sensor reaches a threshold Th in a case where the center of a light spot is at a position where the shapes of the convex and concave surface are different.

That is, as shown in FIG. 17, it is necessary for there to be an increase by a reflected light amount $\Delta S1$ which is relatively large until the sensor output reaches the threshold Th in a case where the center of the light spot is positioned at the top surface 88a and the sensor output is a value "a" which is relatively high (which is equivalent to FIG. 14A) and a transport amount y1 for the sheet P which is necessary to achieve this is relatively large. In contrast to this, as shown in FIG. 17, only an increase by a reflected light amount $\Delta S3$ which is relatively small is needed until the sensor output reaches the threshold Th in a case where the center of the light spot is positioned at the bottom surface 88d and the sensor output is a value "c" which is relatively low (which is equivalent to FIG. 14B) and a transport amount y3 (<y1) for the sheet P which is necessary to achieve this needs only to be relatively small. Furthermore, as shown in FIG. 17, it is necessary for there to be an increase by a reflected light amount $\Delta S2$ which is between $\Delta S1$ and $\Delta S3$ until the sensor output reaches the threshold Th in a case where the center of the light spot SP is positioned at the inclined surface 88c (or 88b) and the sensor output is an intermediate value "b" and a transport amount y2 (where y3<y2<y1) for the sheet P which is necessary to achieve this is also an intermediate value.

Here, there are cases where the center position of the light spot SP slightly deviates from the center of the width of the top surface 88a in the scanning direction when the second sensor 75 is arranged at the first position P1 or the second position P2 due to a cause such as irregularities in assembling the support platform 39 or irregularities in the assembly position of the second sensor 75 with regard to the carriage 18. As shown in FIG. 15A, even when the position of the concave and convex surface 81b in the light spot SP is deviated in the scanning direction, the effect on sensor output due to the deviation only needs to be relatively small since the proportion of the concave and convex surface 81b taken up in the light spot SP is relatively small in a case where the proportion of the sheet P taken up in the light spot SP when the front edge of the sheet P is located is relatively large.

In contrast to this, as shown in FIG. 15B, when the position of the concave and convex surface 81b in the light spot SP is deviated in the scanning direction, the effect on sensor output due to the deviation is relatively large since the proportion of the concave and convex surface 81b taken up in the light spot SP is relatively large in a case where the proportion of the sheet P taken up in the light spot SP when the front edge of the sheet P is located is relatively small.

Due to reasons such as these, the first position P1, the second position P2h on the home position side, and the second position P2o on the opposite side to the home position are set at positions so that the center of the light spot SP is arranged at the top surface 88a of the convex section 88 in the present embodiment. In particular, the first position P1 and the two second positions P2h and P2o are set at the center of the width of the top surface 88a in the present example. Each of the positions P1, P2h, and P2o are stored in a non-volatile memory which is not shown in the diagram in the controller 70 as counting values which are equivalent to pulse measuring values for the linear encoder 72 which ascertain the position of the carriage 18.

In addition, the controller 70 acquires the reference position for the carriage 18 in the scanning position by matching levels. In detail, the controller 70 matches levels by moving the carriage 18 until the carriage 18 hits an end position on the home position side by driving the carriage motor 40 and the counter for carriage position measuring is reset at a position when the carriage 18 hits the end position. In this manner, the reference position for the carriage 18 (for example, where the measuring value is "0") is acquired by matching levels. Then, the controller 70 reads out each of the setting positions, which are for the first position P1 and the second position P2 (P2h or P2o) on the concave and convex surface 81b which are determined in advance, from the non-volatile memory. The carriage 18 is moved in the scanning direction and the carriage 18 is stopped when the counter measuring value for carriage position measuring which is reset at the reference position reaches the first position P1 or the second position P2 which is the target at this time. Due to this, the carriage 18 is positionally aligned in the scanning direction at the first position P1 and the second position P2 in a relatively accurate manner.

In addition, as another method, the controller 70 detects positions where the shapes of the concave and convex surface 81*b* are the same (for example, the top surface 88*a*) using the second sensor 75 by moving the carriage 18 in a state where the sheet P is not on the support platform 39 and finds the counter measuring value which is equivalent to the center of the width of the top surface 88*a* as the first position P1 and the second position P2 based on the positions which are detected. For example, a position, where the shapes of the concave and convex surface 81*b* are the same and which is determined in advance (for example, the center of the width of the top surface 88*a*), is found with regard to each of the convex sections 88 which respectively correspond to the first position P1 and the second position P2 with the output value of the second sensor 75 shown in FIG. 13 as a reference and the positions which are found are set as the first position P1 and the second position P2. For example, it is sufficient if the process for setting the first position P1 and the second position P2 in this manner is performed during an initializing operation when the power source is turned on, when the period of time which has elapsed since the previous setting process has reached a predetermined period of time, or when the number of printings since the previous setting process has reached a predetermined number of printings. Then, the second sensor 75 is arranged at the first position P1 or the second position P2 which are set in this manner by moving the carriage 18.

Next, actions of the printing apparatus 11 which is configured as described above will be described.

Figure 18:
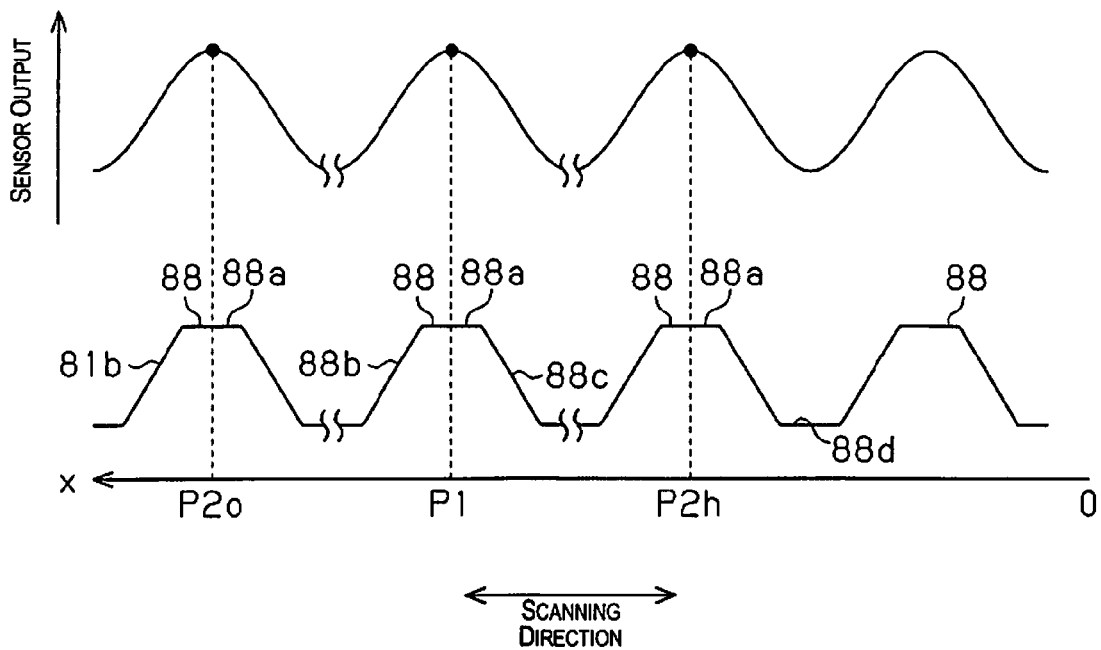
FIG. 18 is an explanatory diagram illustrating the output of a sensor in a case where each position during detecting of skew is positioned on a top section of a convex section.

As shown in FIG. 18, the center of the light spot SP is positioned at the center of the width of the top surface 88*a* when the second sensor 75 is arranged at the first position P1. In addition, the center of the light spot SP is positioned at the center of the width of the top surface 88*a* even in a case where the second position P2 is either of the second position P2*h* on the home position side or the second position P2*o* on the opposite side to the home position when the second sensor 75 is arranged at the second position P2 (P2*h* or P2*o*). As a result, as shown in FIG. 18, the sensor output is a value in the vicinity of the maximum value even in a case of being anywhere on the sensor output waveform (waveform signal) which changes in waves depending on the positioning of the center of the light spot SP on whichever surface of the convex section 88 when the sheet P is detected at each of the positions P1 and P2. Then, it is possible to acquire a transport amount which is relatively accurate since the proportion of the sheet P taken up in the light spot SP is a state which is the same at each of the positions P1 and P2 as shown in FIG. 15A in a state where the sheet P is transported until the sensor output reaches the threshold Th in order for the front edge of the sheet P to be located.

In contrast to this, for example, the proportion of the sheet P taken up in the light spot SP is relatively large as shown in FIG. 15A when the front edge of the sheet P is located at the first position P1. Then, the proportion of the sheet P taken up in the light spot SP is relatively small as shown in FIG. 15B when the front edge of the sheet P is subsequently located at the second position P2 by the sheet P being transported to the second position P2. In this case, there are irregularities in the transport distance y between the first position P1 and the second position P2 according to differences in the proportion of the sheet taken up in the light spot SP. However, it is possible to acquire the transport distance y between the positions P1 and P2 which is relatively accurate since each of the positions P1 and P2 are set at positions where the shapes of the concave and convex surface 81*b* are the same and the proportion of the sheet P taken up in the light spot SP at each of the positions P1 and P2 is substantially the same. As such, it is possible to find the skew angle θ with relatively high precision using the transport distance y and the regulating movement distance x.

Figure 19:
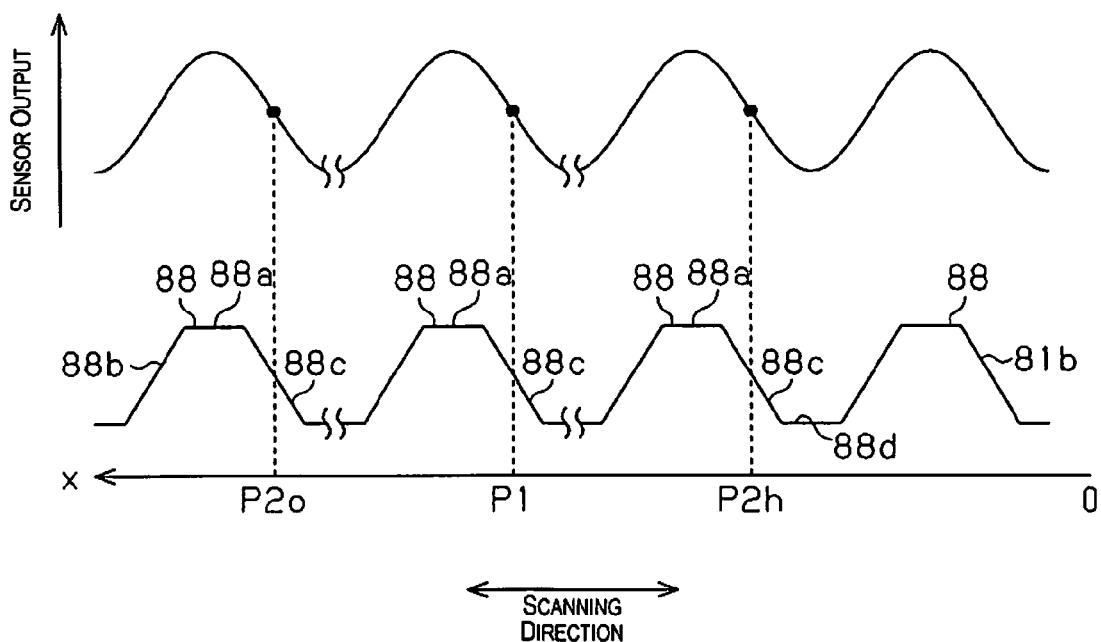
FIG. 19 is an explanatory diagram illustrating the output of a sensor in a case where each position during detecting of skew is deviated in the scanning direction with regard to a convex and concave surface.

In addition, there are cases where the concave and convex surface 81*b* deviates with regard to the designated position in the scanning direction with regard to the reference position for the carriage 18 due to causes such as irregularities in the assembly position of the support platform 39 in the printing apparatus 11. In this case, the center of the light spot SP deviates from the center of the width of the top surface 88*a* of the convex section 88 even when the second sensor 75 is arranged at the first position P1 or the second position P2 (P2*h* or P2*o*) which are stored in the non-volatile memory. However, as shown in FIG. 19, the first position P1 and the second position P2 (P2*h* or P2*o*) deviate to positions which are substantially the same in respectively the same surfaces on the convex section 88 since the deviations are the same distances in the orientations which are the same in the scanning direction from the center of the width of the top surface 88*a* of the convex section 88 which respectively correspond to the first position P1 and the second position P2. That is, each of the positions P1 and P2 deviate to positions where the shapes of the concave and convex surfaces 81*b* are the same. As a result, the sensor output when there is no sheet P is the same at each of the positions P1 and P2. Accordingly, the proportion of the sheet taken up in the light spot SP is substantially the same at either of the positions P1 or P2 when the front edge of the sheet P is located by the sheet P being transported so that the sensor output value reaches the threshold Th. As such, it is possible to acquire the transport distance y between the positions P1 and P2 which is relatively accurate. As a result, it is possible to find the skew angle θ with high precision using the transport distance y even in a case where each of the positions P1 and P2 deviate with regard to the top surface 88*a* of the convex section 88 in the scanning direction.

Errors in the skew angle θ which is acquired are relatively large in a case of a state where the proportions of the sheet P taken up in the light spot SP are respectively as shown in FIGS. 15A and 15B when the front edge of the sheet P is located at the positions P1 and P2. In contrast to this, it is possible to acquire the skew angle θ with an error of, for example, appropriately ¼ in the present embodiment in a state where the proportions of the sheet P taken up in the light spot SP are both as shown in FIG. 15A when the front edge of the sheet P is located at the positions P1 and P2.

According to the second embodiment as described above, it is possible to obtain the following further effects in addition to the effects which are the same as the first embodiment.

(5) It is possible to acquire the transport distance y with few errors, which are included due to the front edge of the sheet P being located using whichever surface of the convex section 88 since the first position P1 and the second position P2 are set at positions where the shapes of the concave and convex surface 81*b* are the same due to the first position P1 and the second position P2 being the same positions on surfaces which are the same out of the plurality of surfaces 88*a* to 88*d* which are formed in the concave and convex surface 81*b*. As such, it is possible to calculate the skew angle θ with high precision using the transport distance y and the regulating movement distance x.

(6) Even when the positions P1 and P2 of the second sensor 75 deviate from the positions on the surfaces of the convex section 88 which are set in advance (for example, the center of the width of the top surface 88*a*) due to causes such as irregularities in the assembly position of the support platform 39, the deviations are distances which are substantially the same with the same orientations. As a result, it is possible to acquire the transport distance y which is relatively accurate since the output value of the second sensor 75 is substantially the same at each of the positions P1 and P2 before starting transporting of the sheet P and the proportion of the sheet P taken up in the light spot SP is substantially the same when the front edge of the sheet P is located by the second sensor 75. As such, it is possible to acquire the skew angle θ which is relatively accurate using the transport distance y.

(7) The control unit 70*a* positionally aligns the carriage 18 in a relative manner with regard to the concave and convex surface 81*b* in the scanning direction by acquiring the reference position for the carriage 18 by matching levels and arranging the carriage 18 at the first position P1 or the second position P2 which are determined in advance with the reference position as a reference. As a result, it is possible to arrange the second sensor 75 at positions where the shapes of the concave and convex surface 81*b* are the same when the second sensor 75 is arranged at either of the first position P1 or the second position P2.

(8) As another method, the controller 70 detects the positions where the shapes of the concave and convex surface 81*b* are the same using the second sensor 75 by moving the carriage 18 in a state where there is no sheet P on the support platform 39 and sets the first position P1 and the second position P2 to be positions where the shapes of the concave and convex surface 81*b* are the same based on the result of the detecting. Then, the second sensor 75 is arranged at the first position P1 or the second position P2 which are set in this manner by the carriage 18 being moved. In a case where this configuration is adopted, it is possible to arrange the second sensor 75 at the first position P1 or the second position P2 where the shapes of the concave and convex surface 81*b* are the same even when there are irregularities or the like in assembling the support platform 39.

(9) The first position P1 and the second position P2 are both set at positions on the top surface 88*a* of the convex section 88. There are cases where, for example, ink gathers or flows in the bottom section 88*d* since the bottom section 88*d* is a portion which is the lowest in the concave and convex surface 81*b* and it is easy for light reflectivity to change due to the effects of ink in this case. However, according to the present embodiment, it is possible for it to be easy for light reflectivity to be comparatively stable and for erroneous detecting to be reduced since the first position P1 and the second position P2 are set at positions on the top surfaces 88*a* of the convex sections 88. In addition, it is possible for the proportion of the sheet P taken up in the light spot SP to be relatively large when the front edge of the sheet P is located by the sheet P being transported until the output value of the second sensor 75 reaches the threshold Th. As a result, even if the positions P1 and P2 deviate from the center of the width of the top surface 88*a* of the convex section 88, it is difficult for there to be any effect due to the deviations, and to this extent, it is possible to acquire the transport distance y which is relatively accurate since the proportion of the concave and convex surface 81*b* taken up in the light spot SP is relatively small when the front edge of the sheet P is located. As a result, it is possible to find the skew angle θ which is relatively accurate using the transport distance y which is relatively accurate.

(10) The first position P1 and the second position P2 are set at positions on the surface section, where the reflected light where light which is irradiated from the second sensor 75 is reflected is the lowest amount of reflected light which is received in the second sensor 75, out of the plurality of types of surface sections which are regulated by the shape of the concave and convex surface 81*b*. As a result, it is possible for the proportion of the sheet P taken up in the light spot SP of the second sensor 75 is relatively large since the transport amount, when the sheet P enters into the light spot SP until the output of the second sensor 75 exceeds the threshold Th, is relatively large. As a result, even when, for example, the position of the second sensor 75, which is arranged at the first position P1 and the second position P2, on the concave and convex surface 81*b* slightly deviates due to causes such as irregularities in assembling the support platform 39, it is possible for the effects due to the deviations to be relatively small. As such, it is possible to reduce erroneous detecting of skew relative to the positional deviation.

(11) The diameter of the spot of light which is irradiated from the second sensor 75 onto the concave and convex surface 81*b* is set to be larger in the scanning direction than the width of the top surface 88*a*. There are cases where there are locations with localized abnormalities in light reflectivity on the convex and convex surface 81*b* at a specific surface which is a detection target due to, for example, paper dust, ink mist, or the like being attached. Even in cases such as this, it is possible to reduce erroneous detecting of skew since the proportion of the abnormal locations which are taken up in the light spot SP is relatively small as the diameter of the light spot SP is wider than the width of the top surface 88*a*.

Here, it is possible to modify each of the embodiments described above in, for example, the following manner.

It is sufficient if the first position P1 is a position where it is possible for the front edge of the sheet P, which is transported to the recording unit 28, in the transport direction to be located by the second sensor 75, but it is not necessary for the position P1 to be at the center of the sheet P in the scanning direction.

The printing apparatus 11 need not be configured so that the central position of the sheet P, which is transported to the recording unit 28, in the scanning direction is always constant without any relationship to the size of the sheet P. The present invention may be applied to a printing apparatus where the sheet P is set by hitting up against an edge (reference edge) in the scanning direction. In this case, the central position of the sheet P, which is transported to the recording unit 28, in the scanning direction changes due to the size of the sheet P, but it is possible to deal with this by changing the first position P1 to match with the changes in the central position of the sheet P, in other words, to match with the changes in the size of the sheet P.

The regulating movement distance x need not be shorter than the distance from the first position P1 to the edge of the sheet P in the scanning direction, in other words, the second position P2 need not protrude from the edge of the sheet P to the outside in the scanning direction, and it is possible to appropriately change the regulating movement distance x while satisfying such conditions.

It is not necessary to execute the operating of the transport unit 27 and the carriage 18 in order to detect skew in the sheet P every time that the sheet P is transported to the recording unit 28, and the operations may be executed according to the type of the sheet P. For example, operating of the transport unit 27 and the carriage 18 in order to detect skew in the sheet P may be executed when printing with high precision is necessary such as when the sheet P is for 3D printing and the operation need not be executed when printing with high precision is not necessary such as when the sheet P is for general printing. In this case, it is possible to execute the operating of the transport unit 27 and the carriage 18 in order to detect skew when printing on the sheet P with high precision is necessary and skew in the sheet P is a problem in respect to printing with regard to the sheet P, in other words, only when it is necessary to detect skew. On the other hand, it is possible to not perform operating of the transport unit 27 and the carriage 18 in order to detect skew when recording on the sheet P with high precision is not necessary and skew in the sheet P is not a problem in respect to printing with regard to the sheet P, in other words, when it is not necessary to detect skew. In addition, by not executing detecting of skew in the sheet P unnecessarily, it is possible to suppress the time to starting of printing with regard to the sheet P from becoming longer in accordance with execution of detecting skew which is unnecessary.

When skew is detected in the sheet P, a skew removal operation in order to eliminate skew in the sheet P using the transport unit 27 may be performed instead of the sheet P being discharged to the stacker 23 by being transported to the downstream side. It is conceivable that either of the two types of operations of (A) or (B) described above may be performed as the skew removal operation at this time.

In detail, when skew is detected in the sheet P which is transported to the recording unit 28, the sheet P is returned so that the front edge of the sheet P in the transport direction is positioned more upstream in the transport direction than the transport driving holler 37 and the transport driven roller 38 by the supply driving roller 34 and the transport driving roller 37 being driven to rotate in the opposite direction to when the sheet P is being transported. Eliminating of skew in the sheet P is achieved again by performing either of the two types of skew removal operations of (A) or (B) in this state. Then, it is possible to start printing with regard to the sheet P using the recording unit 28 after this in a case where the skew is actually eliminated in a repeat of the skew detecting process (in a case of affirmative determination in S110). As a result, it is possible to dispense with the trouble of resetting the sheet P which is discharged in the supply cassette 16 as in a case where the sheet P which is skewed is discharged to the stacker 23.

Here, it is possible to apply the present invention as in the embodiments described above to a configuration of a printing apparatus where it is not possible for the supply driving roller 34 to be driven to rotate in the opposite direction in a case where the sheet P is discharged to the downstream side in the transport direction (the stacker 23 side) when skew is detected in the sheet P.

It is sufficient if the first position P1 and the second position P2 in the second embodiment are set at positions where the shapes of the concave and convex surface 81*b* are the same. For example, the first position P1 and the second position P2 may be both set at positions on the inclined surfaces 88*b* or may be both set at positions on the inclined surfaces 88*c*. In addition, the first position P1 and the second position P2 may be both set at positions on the bottom surfaces 88*d*. Here, in a case where the first position P1 and the second position P2 are set at positions on the inclined surfaces 88*b* or 88*c*, it is desirable that the first position P1 and the second position P2 be aligned on the same inclined surface with an inclined orientation but the first position P1 and the second position P2 may be each set at positions on the inclined surfaces 88*b* and 88*c* with different inclined orientations.

The convex section in the second embodiment may be the first ribs 84. The first position P1 and the second position P2 may be set at positions where the shapes of the first ribs 84 are the same. In this case, the bottom surface of the concave section 81*a* need not be the concave and convex surface.

The medium which is the target of recording using the printing apparatus is not limited to the sheet and may be any object with a sheet shape where printing (recording) using the recording unit of the printing apparatus is possible. For example, the medium may be a film made of resin, a composite film of paper and resin, a composite film of resin and metal (a laminate film), cloth, non-woven fabric, metal foil, metal film, ceramic sheets, or the like.

Here, the configurations of each of the applied examples in the present application have an effective function with regard to printing onto a lenticular LC.

Figure 20:
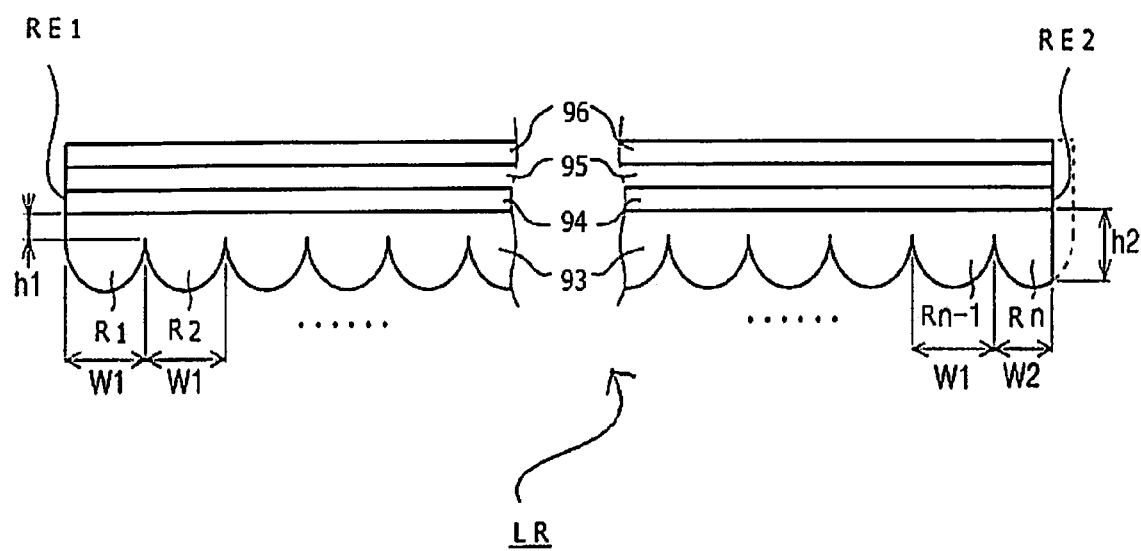
FIG. 20 is a cross sectional diagram of a main scanning direction of a lenticular LC.

It is possible for the lenticular LC to be used as the sheet P in the printing apparatus 11 in the present embodiment. FIGS. 21A and 21B are explanatory diagrams illustrating an outline of a configuration of the lenticular LC and FIG. 20 is a cross sectional diagram where the lenticular LC is sliced in a main scanning direction. The lenticular LC has a lenticular lens LR with a sheet shape where lens bodies R1 to Rn (where n is an integer of two or more) are arranged in parallel. The lens bodies R1 to Rn−1, which exclude the lens body Rn which is arranged at an edge portion RE2, are formed with semi-cylindrical shapes where the shape precision is substantially uniform with a width W1 where the width (lens width) in the left and right direction is substantially constant. The lens body R1 which is arranged at an edge portion RE1 of the lenticular LC is arranged so that the concave section conforms to the edge portion RE1. The lens body Rn which is arranged at the edge portion RE2 of the lenticular LC is formed with a lens width W2 which is smaller than the lens width W1 of the lens bodies R1 to Rn−1 with a shape as if a portion of the lens bodies R1 to Rn−1 were cut out as shown by the dashed line in FIG. 20. That is, the shape precision of the lens body Rn is low with regard to the lens bodies R1 to Rn−1. An image with parallax in a surface RS (that is, an ink absorbing layer 96), which is on the opposite side to the concave and convex surface of the lenticular lens LR, is directly printed onto the lenticular LC. It is possible to view the image which is printed as a stereoscopic image by a user viewing the image which is printed through the lenticular lens LR.

Figure 21:
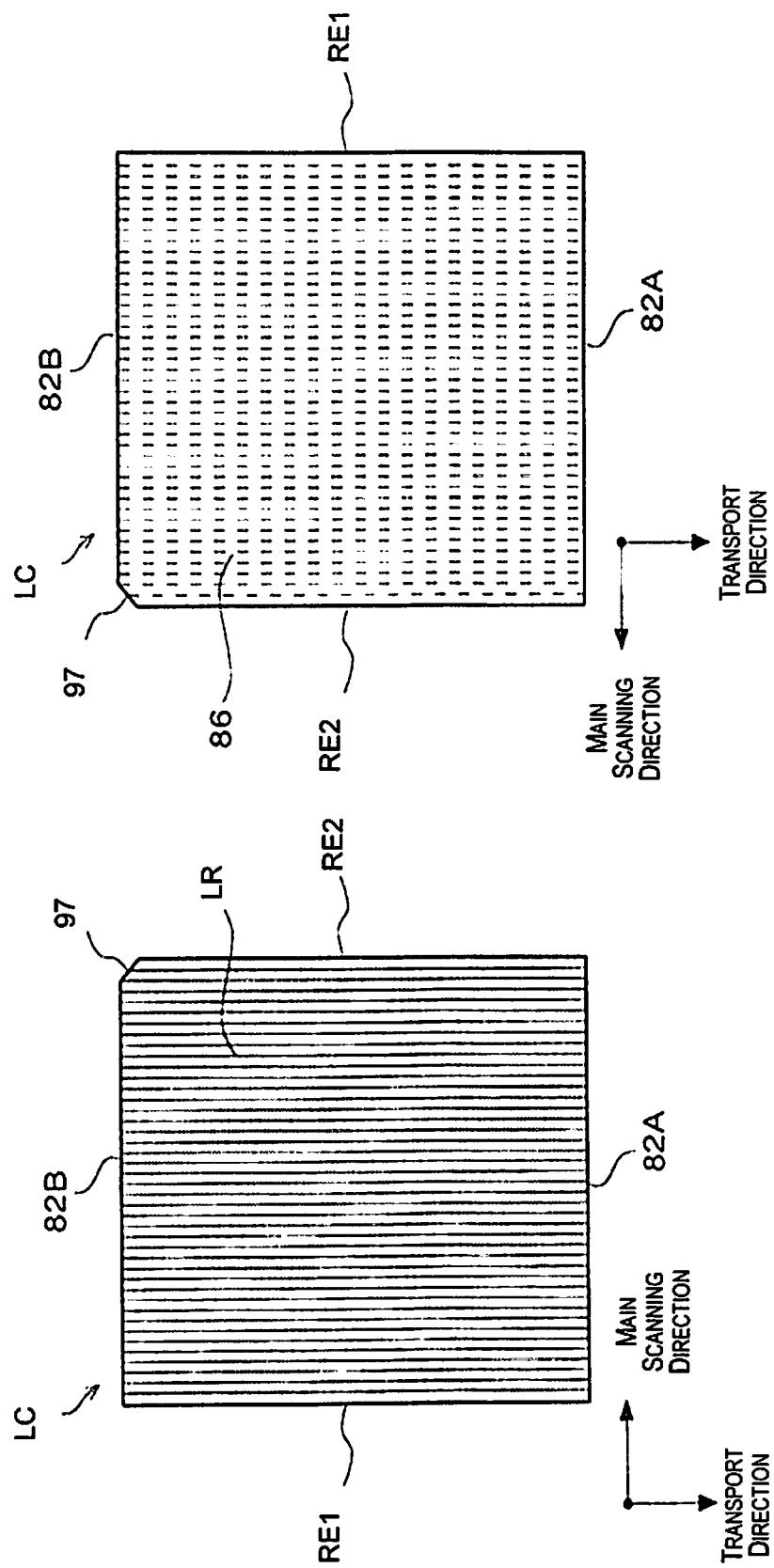
FIG. 21A is a planar diagram of a lenticular LC which is an example of a medium which is a recording target as in the present invention viewed from a lens layer side.
FIG. 21B is a planar diagram of the lenticular LC viewed from an ink absorbing layer side.

In addition, the lenticular LC is formed so that the edge portion RE1 on one side in the main scanning direction and the edge portion RE2 on the other side in the main scanning direction are asymmetrical. In detail, a portion of RE2 (a portion which is indicated by the reference numeral 97) is cut out as shown in FIG. 21, and due to this, the edge portion RE1 and the edge portion RE2 are asymmetrical. The cutout portion 97 is a mark (an identification mark), and when performing recording using the printing apparatus 11, it is possible to easily and reliably perform this when matching the edge surface on the one side, that is, the edge section which is to be a reference (the edge portion RE1 in the present applied example) with the appropriate direction and it is possible to reliably obtain an excellent recording result as a result.

Here, the cutout portion 97 is formed so that an angle of 45° is formed with regard to the main scanning direction and the transport direction as an example. That is, the cutout portion 97 may be formed with any shape, positioning, or size as long as it is possible for a user to recognize which of the sides is the edge portion RE1 which is a reference.

Figure 22:
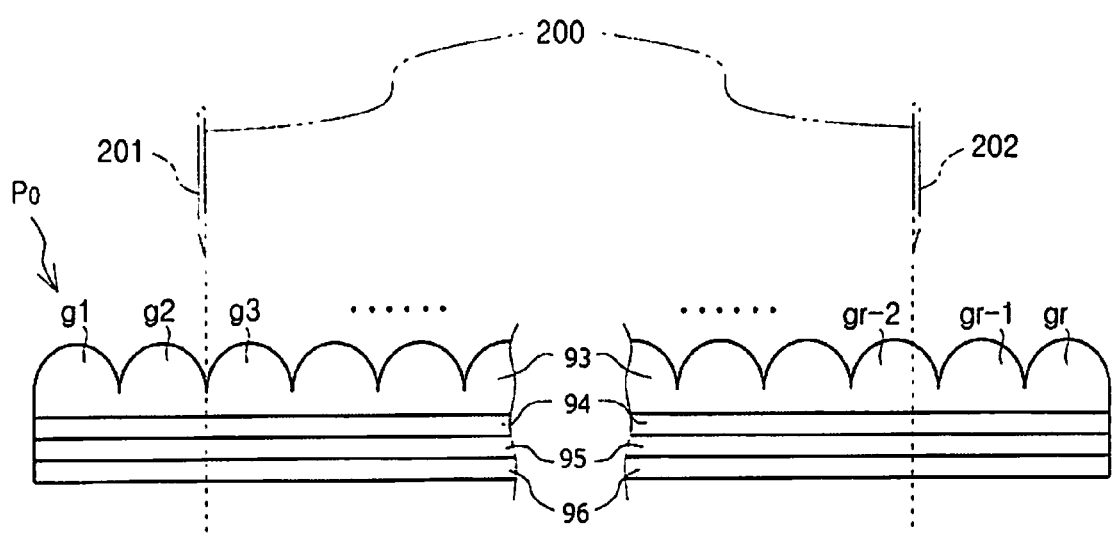
FIG. 22 is a diagram schematically illustrating positional alignment in a process for punching out a lenticular LC.

In addition, a diagram of the entirety of a cutting apparatus which forms (cuts out and punches) the lenticular LC is omitted but FIG. 22 shows a punching mold 200 for when punching out the lenticular LC from a lenticular sheet P0 (a sheet which is the basis for the lenticular LC with a size which is larger than the lenticular LC). Since the lenticular LC in the present applied example has a rectangular shape, a punching mold 200 is also a rectangular shape which follows this shape and is configured using four blades so as to form (punch out) the four sides of the lenticular LC. The reference numerals 201 and 202 are two blades which configure the four blades and face each other. The other two blades are omitted from the diagram of FIG. 22.

In FIG. 22, the respective lens are shown with the reference numerals g1 to gr and the lenticular LC after being punched out is shown to be configured by the lenses from g3 to gr-2. That is, the lens g3 in FIG. 22 is the lens R1 in FIG. 20 and the lens gr-2 in FIG. 22 is the lens Rn in FIG. 20.

In a punching out process as shown in FIG. 22, the blade 201 is positionally aligned and punched through between the lens g2 and the lens g3 which are adjacent in the main scanning direction of FIG. 22.

That is, in the present invention, the cutting surface when cutting is performed is the edge portion RE1 in FIG. 20 with strict monitoring so that the cutting blade (the blade 201 in FIG. 22) enters at a position precisely in the gaps between the lenses gk which are adjacent. The edge portion RE2 on the other side in FIG. 20 is a slicing surface when cutting with the cutting apparatus without precise management (where positional alignment of the cutting apparatus is not performed).

Accordingly, a thickness h1 of a lens layer 93 at the edge portion RE1 is thinner than a thickness h2 of the lens layer 93 at the edge portion RE2 as shown in FIG. 20. Here, the overall thickness of the edge portion RE1 is thinner than the overall thickness of the edge portion RE2 since the thickness of each of the layers other than the lens layer 93 is uniform.

In addition, w1 which is the width of the lens R1 which is formed at the edge portion RE1 is wider than w2 which is the width of the lens Rn which is formed at the edge portion RE2 on the other side, and w1 which is the width of the lens R1 is equivalent to the width of the lens R2 (w1) which is adjacent to the lens R1. Here, the widths of the lenses Rk other than the lens at the edge sections are w1.

That is, it is sufficient if the cutting apparatus is strictly monitored when forming the edge portion RE1 on the one side and it is not necessary for the cutting apparatus to be strictly monitored when forming the edge portion RE2 on the other side. Accordingly, it is possible to suppress complicating the cutting apparatus and rising costs, and as a result, it is possible to prevent rising costs for the lenticular LC.

Here, cutting is performed to strictly monitor only RE1 with the meaning of suppressing increases in the complexity and costs of the cutting apparatus, but there is a possibility that cutting at the cutting position of RE2 is carried out with the same monitoring as with RE1 since there are cases where the lenticular PO slightly expands or contracts according to the environment when cutting (such as temperature and humidity).

Figure 23:
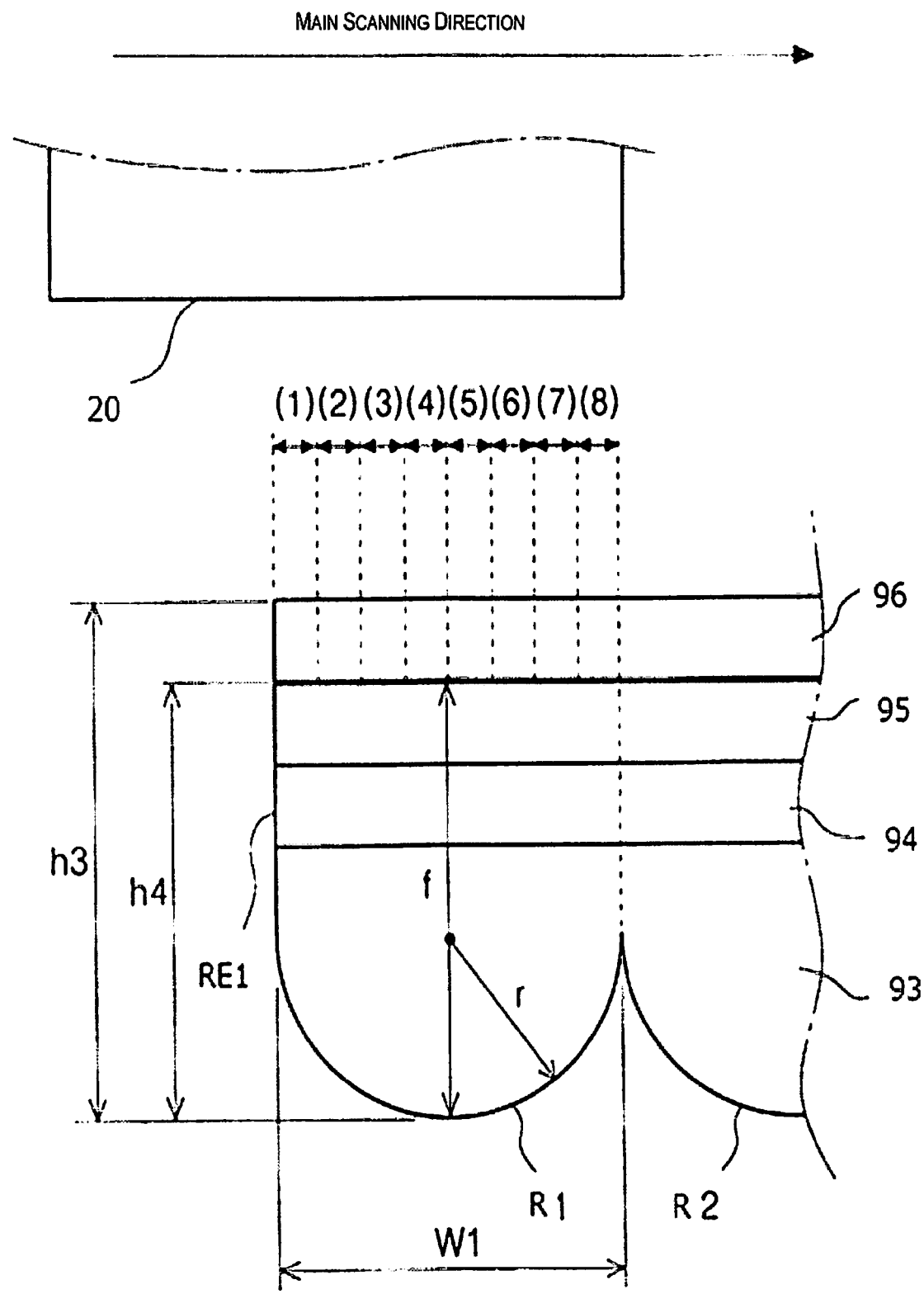
FIG. 23 is a cross sectional diagram where an edge surface on one side of a lenticular LC is sliced along a main scanning direction.

Then, it is possible to prevent recording across other lenses which are adjacent to the image which is to be recorded on one of the lenses Rk when recording is performed in the lenticular LC with the edge portion RE1 which is formed by exact slicing as a reference. That is, it is possible to reliably fit the image of (1) to (8) entirely in the lens R1 in the example in FIG. 23 and it is possible to obtain excellent visual effects.

Here, when printing, the position for starting printing is specified by detecting an edge 82A using the second sensor 75. At this time, the cutout portion 97 may be located by the second sensor 75 by scanning with the carriage 18. By doing this, it is possible to prevent printing mistakes which are caused by errors in the placement orientation of the lenticular LC by the user. That is, since it is possible to determine whether the assumed placement direction of the lenticular LC is placed with the reverse orientation with regard to the transport direction in a case where the cutout portion 97 is detected by the second sensor 75 when starting printing, it is possible to print from the edge portion RE1 if the direction for starting discharging of ink is reversed with regard to the main scanning direction and it is possible to achieve an improvement in printing quality even in a case where the lenticular LC is placed with the reverse orientation with regard to the transport direction. In addition, the user may be notified so as to reset placement of the lenticular LC in a case where the lenticular LC is placed in an erroneous direction by the user. In addition, the placement direction of the lenticular LC may be announced to the user in advance when printing onto the lenticular LC without depending on locating the cutout portion 97.

In addition, printing may be carried out from the edge section where a lens with high precision is positioned by, for example, detecting the width of the lens which is positioned at each edge section using the second sensor 75 since the edge portion RE1 with a wide width is highly precise (was strictly monitored) when comparing the widths of the edge portion RE1 and the edge portion RE2.

The invention claimed is:

1. A printing apparatus comprising:
a transport unit configured to transport a medium to a recording unit configured to perform recording with regard to the medium, the medium having a lens sheet where a plurality of lenses are arranged parallel to each other;
a carriage provided in the recording unit, the carriage being configured to move in a scanning direction which intersects with regard to a transport direction of the medium by the transport unit, the carriage having a recording head configured to print on the medium;
a sensor provided in the carriage, the sensor being configured to locate presence or absence of the medium;
a control unit configured to control operating of the transport unit and the carriage; and
a detection unit configured to detect skew of the medium relative regard to the transport direction,
the control unit being further configured to
move the carriage to a first position where a front edge of the medium in the transport direction is located by the sensor,
move the carriage in a direction such that the sensor no longer locates the medium to a second position, which is separated from the first position by a regulating movement distance, when the front edge of the medium, which is transported to the recording unit by the transport unit, in the transport direction is detected by the sensor at the first position, and
transport the medium using the transport unit to where the sensor locates the front edge of the medium in the transport direction at the second position,
the detection unit being further configured to detect skew of the medium relative to the transport direction of the medium based on the regulating movement distance and the transport distance of the medium by the transport unit from where the sensor locates the front edge of the medium in the transport direction at the first position to where the sensor locates the front edge of the medium in the transport direction at the second position,
the control unit being further configured to compare the skew and a predetermined value, and operate the transport unit such that the medium is discharged out of the printing apparatus without printing of the recording head on the medium according to a result of comparing the skew and the predetermined value.

2. The printing apparatus according to claim 1, wherein the control unit is further configured to move the carriage to one side in the scanning direction after the front edge of the medium in the transport direction is located by the sensor at the first position, reverse a movement direction of the carriage in a case where the medium is located by the sensor at the one side, and perform moving of the carriage by the regulating movement distance in a case where the medium is not located by the sensor.

3. The printing apparatus according to claim 2, wherein the control unit is further configured to execute a skew removing operation in order to eliminate the skew of the medium using the transport unit before the detection unit starts detecting the skew of the medium.

4. The printing apparatus according to claim 1, wherein the control unit is further configured to execute operating of the transport unit and the carriage in order to detect the skew of the medium relative to the transport direction by the detection unit, when the medium which is transported to the recording unit is a medium for which recording with high precision is necessary, and the control unit is further configured not to execute the operating of the transport unit and the carriage in order to detect the skew of the medium relative to the transport direction by the detection unit, when the medium which is transported to the recording unit is a medium for which recording with high precision is not necessary.

5. The printing apparatus according to claim 4, further comprising:
   a supporting section configured to support the medium, the supporting section having a concave and convex surface which is formed by a plurality of convex sections which are provided along the scanning direction, wherein the first position and the second position are each set at positions in the scanning direction where shapes of the concave and convex surface are the same.

6. The printing apparatus according to claim 5, wherein the control unit is further configured to positionally align the carriage in the scanning direction by acquiring a reference position for the carriage by matching levels and moving the carriage to the first position and the second position which are determined in advance with the reference position as a reference.

7. The printing apparatus according to claim 6, wherein the control unit being further configured to detect positions where the shapes of the concave and convex surface are the same using the sensor by moving the carriage in a state where no medium is on the support section and acquire the first position and the second position where the sensor is to be arranged based on the positions which are detected.

8. The printing apparatus according to claim 7, wherein the first position and the second are set to positions on top surfaces of the convex sections.

9. The printing apparatus according to claim 5, wherein the first position and the second position are set to positions on a surface section where an amount of received light, where reflected light of light which is irradiated from the sensor is received in the sensor, is the lowest out of a plurality of types of surface sections which define the shape of the convex and concave surface.

10. The printing apparatus according to claim 8, wherein in the scanning direction, a diameter of a light spot which is irradiated from the sensor onto the convex and concave surface is wider than a width of the top surface.

* * * * *